US012636884B2

(12) United States Patent (10) Patent No.: US 12,636,884 B2
Masada et al. (45) Date of Patent: May 26, 2026

(54) INK JET RECORDING METHOD AND INK JET RECORDING APPARATUS

(71) Applicant: CANON KABUSHIKI KAISHA, Tokyo (JP)

(72) Inventors: Aiko Masada, Tokyo (JP); Kazuhiko Araki, Kanagawa (JP); Yuki Nishino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 18/739,828

(22) Filed: Jun. 11, 2024

(65) Prior Publication Data

US 2024/0408871 A1 Dec. 12, 2024

(30) Foreign Application Priority Data

Jun. 12, 2023 (JP) ................................. 2023-096385
May 27, 2024 (JP) ................................. 2024-085388

(51) Int. Cl.
| | |
|---|---|
| *B41J 2/15* | (2006.01) |
| *B41J 2/045* | (2006.01) |
| *B41J 2/14* | (2006.01) |
| *B41J 2/175* | (2006.01) |
| *C09D 11/322* | (2014.01) |
| *C09D 11/326* | (2014.01) |

(52) U.S. Cl.
CPC ............. *B41J 2/15* (2013.01); *B41J 2/04528* (2013.01); *B41J 2/1404* (2013.01); *B41J 2/17596* (2013.01); *C09D 11/322* (2013.01); *C09D 11/326* (2013.01); *B41J 2002/14475* (2013.01); *B41J 2202/12* (2013.01)

(58) Field of Classification Search
CPC ........ B41J 2/15; B41J 2/04528; B41J 2/1404; B41J 2/17596; B41J 2002/14475; B41J 2202/12; C09D 11/322; C09D 11/326
See application file for complete search history.

(56) References Cited

U.S. PATENT DOCUMENTS

| | | | |
|---|---|---|---|
| 7,247,193 | B2 | 7/2007 | Sato |
| 9,493,664 | B2 | 11/2016 | Tsuji et al. |
| 9,511,612 | B2 | 12/2016 | Noguchi et al. |
| 9,662,921 | B2 | 5/2017 | Sugiura et al. |

(Continued)

FOREIGN PATENT DOCUMENTS

| | | |
|---|---|---|
| JP | 2006-070257 A | 3/2006 |
| JP | 2017-124608 A | 7/2017 |

*Primary Examiner* — Henok D Legesse
(74) *Attorney, Agent, or Firm* — Venable LLP

(57) ABSTRACT

Provided is an ink jet recording method capable of recording a high-quality image in which a shift in color tone of a secondary color image recorded with a plurality of inks through use of a circulation serial head is reduced. The ink jet recording method includes recording an image by ejecting an ink from a recording head including: a plurality of ejection orifices; an ejection element; and a first flow path and a second flow path which communicate to each other between each of the plurality of ejection orifices and the ejection element and inside which the ink flows. The plurality of ejection orifice arrays includes a first ejection orifice array to eject a first ink and a second ejection orifice array to eject a second ink. A molar fraction $R_1$ of water in the first ink and a molar fraction $R_2$ of water in the second ink satisfy $R_1 < R_2$.

13 Claims, 11 Drawing Sheets

EVAPORATION OF WATER
FROM EJECTION ORIFICE 5  1

SCANNING DIRECTION OF RECORDING HEAD(FORWARD DIRECTION)

(56) References Cited

U.S. PATENT DOCUMENTS

| | | | |
|---|---|---|---|
| 10,259,963 B2 | 4/2019 | Masada et al. | |
| 10,266,714 B2 | 4/2019 | Tsuji et al. | |
| 10,280,323 B2 | 5/2019 | Fujimoto et al. | |
| 10,487,229 B2 | 11/2019 | Nishino et al. | |
| 10,981,405 B2 | 4/2021 | Araki et al. | |
| 2006/0124027 A1 | 6/2006 | Sato | |
| 2017/0197419 A1* | 7/2017 | Okushima | B41J 2/1433 |
| 2020/0101740 A1* | 4/2020 | Yamagishi | B41J 25/316 |
| 2020/0198335 A1* | 6/2020 | Yamazaki | B41J 2/1404 |
| 2023/0287228 A1 | 9/2023 | Sugie et al. | |

* cited by examiner

Figure 4:
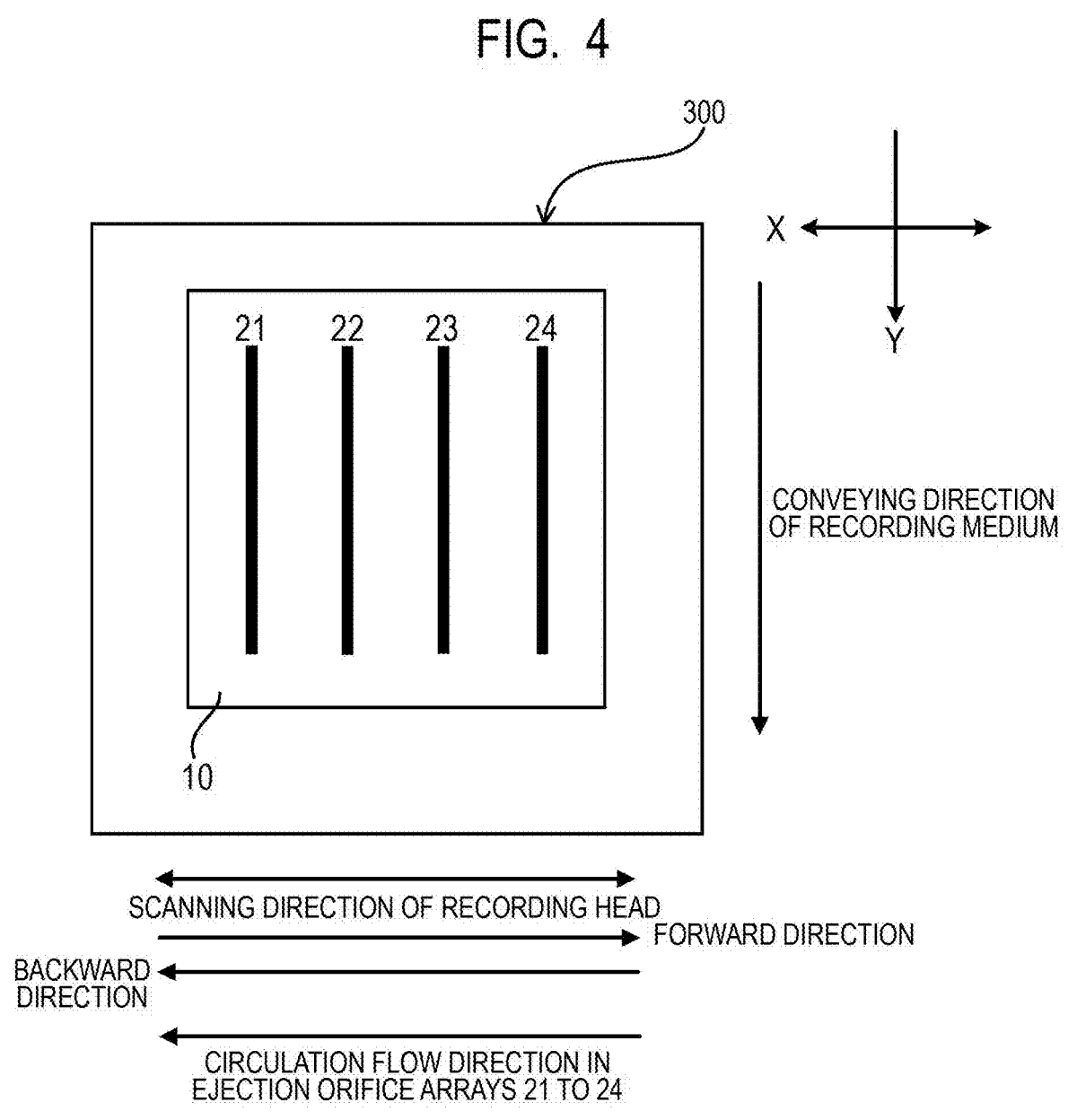

CONVEYING DIRECTION
OF RECORDING MEDIUM 21  22  23  24

10

SCANNING DIRECTION OF RECORDING HEAD

FORWARD DIRECTION

BACKWARD
DIRECTION

CIRCULATION FLOW DIRECTION IN
EJECTION ORIFICE ARRAYS 21 TO 24

EVAPORATION OF WATER
FROM EJECTION ORIFICE

SCANNING DIRECTION OF RECORDING
HEAD(FORWARD DIRECTION)

EVAPORATION OF WATER
FROM EJECTION ORIFICE

SCANNING DIRECTION OF RECORDING
HEAD (FORWARD DIRECTION)

EVAPORATION OF WATER
FROM EJECTION ORIFICE

SCANNING DIRECTION OF RECORDING
HEAD (BACKWARD DIRECTION)

EVAPORATION OF WATER
FROM EJECTION ORIFICE

SCANNING DIRECTION OF RECORDING
HEAD (BACKWARD DIRECTION)

FIG. 8A
FIG. 8B
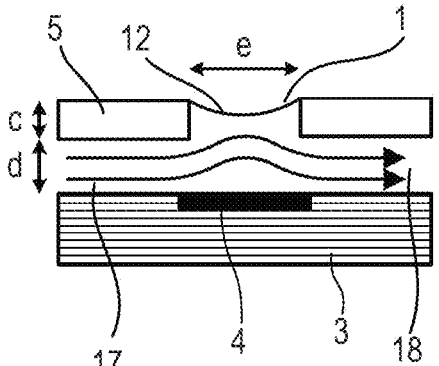 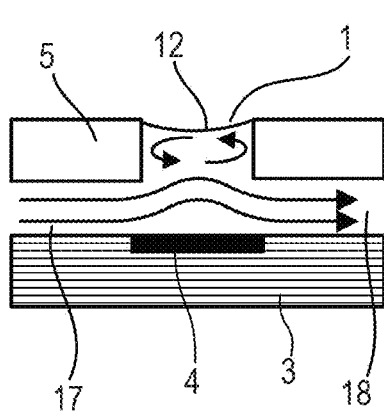

FIG. 9

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

With an ink jet recording method, images, such as photographs and documents, can be recorded on various recording mediums. In addition, there have been proposed various inks in accordance with applications, such as an ink suitable for recording an image of photographic quality on glossy paper and an ink suitable for recording a document or the like on plain paper.

In recent years, the ink jet recording method has been utilized in the case of recording a business document including a character and a diagram on a recording medium such as plain paper, and the frequency of utilization in such applications has been remarkably increased. Moreover, the ink jet recording method has been required to be capable of recording the document at a higher speed than ever before. In addition, there is also a strong need for downsizing of an ink jet recording apparatus because of, for example, limitations on its installation place.

As the type of a recording head of the ink jet recording apparatus, there are two kinds: a serial type and a line type. From the viewpoint of downsizing, a recording head of a serial type (serial head) is advantageous. In order to increase a recording speed through use of the serial head, the following measures are considered necessary. For example, an increase in scanning speed of the recording head is required. In addition, it is required to reduce the frequency of a so-called preliminary ejection operation, which is one kind of recovery treatment performed during scanning of the recording head. Further, it is required to perform single pass recording in which a plurality of inks is applied to a unit region by single relative scanning between the recording head and a recording medium.

As a method of reducing the frequency of the preliminary ejection operation, for example, there has been proposed a liquid ejection head capable of preventing a solid content in a liquid from staying around a peripheral edge of an ejection orifice even after an ejection operation is paused for a predetermined time period (Japanese Patent Application Laid-Open No. 2017-124608).

Meanwhile, in the ink jet recording method, an ink jet recording apparatus having such a configuration that ejection orifices for two or more kinds of inks in a recording head are capped with one cap may be used. In the ink jet recording apparatus, when a plurality of inks is used, there is a problem in that recording unevenness occurs in an initial recording portion after the apparatus is left to stand for a long time period. To deal with this problem, there has been proposed an ink for ink jet in which the molar fractions of water in a plurality of dye inks is uniformized and which can thus suppress recording unevenness (Japanese Patent Application Laid-Open No. 2006-070257).

SUMMARY OF THE INVENTION

In order to achieve both an increase in recording speed and downsizing of a recording apparatus, the inventors of the present invention have made investigations on recording an image by single pass through use of a recording head of a serial type adopting a mechanism for flowing an ink in the vicinity of an ejection orifice (circulation serial head), which has been proposed in Japanese Patent Application Laid-Open No. 2017-124608. As a result, even after an ejection operation was paused for a predetermined time period, the ejection stability of the ink was improved, and the frequency of the preliminary ejection operation performed during scanning of the recording head was able to be reduced.

Next, the inventors of the present invention have made investigations on recording an image by single pass by loading a plurality of pigment inks whose relationship in molar fraction of water is adjusted, with reference to Japanese Patent Application Laid-Open No. 2006-070257, into the circulation serial head. As a result, the inventors have found that there arises a new problem in that when specific scanning conditions and inks having specific compositions are combined, in a secondary color image recorded with the plurality of inks, its color tone at the beginning of recording and its color tone after long-time recording may differ from each other, resulting in a shift in color tone.

Accordingly, an object of the present invention is to provide an ink jet recording method capable of recording a high-quality image in which a shift in color tone of a secondary color image recorded with a plurality of inks through use of a circulation serial head is reduced. In addition, another object of the present invention is to provide an ink jet recording apparatus to be used in the ink jet recording method.

That is, according to the present invention, there is provided an ink jet recording method including recording an image by ejecting an ink from a recording head including: a plurality of ejection orifices each configured to eject the ink; an ejection element configured to generate energy for ejecting the ink; and a first flow path and a second flow path which communicate to each other between each of the plurality of ejection orifices and the ejection element and inside which the ink flows, the ink jet recording method including: an ejection step of ejecting the ink from the plurality of ejection orifices; and a flow step, which is separate from the ejection step, of flowing the ink in the first flow path into the second flow path, wherein the recording head is a recording head of a serial type which includes an ejection element substrate including a plurality of ejection orifice arrays each having the plurality of ejection orifices arranged in a predetermined direction and which is scanned in a direction intersecting with an arrangement direction of the ejection orifice arrays, wherein the first flow path and the second flow path are arranged in parallel to a scanning direction of the recording head and have the same flow direction of the ink, wherein the plurality of ejection orifice arrays includes a first ejection orifice array configured to eject a first ink and a second ejection orifice array configured to eject a second ink, and the first ejection orifice array and the second ejection orifice array are arranged on an upstream side and on a downstream side, respectively, with respect to the flow direction of the ink, wherein the first ink and the second ink are each an aqueous ink containing a pigment, and wherein a molar fraction $R_1$ of water in the first ink and a molar fraction $R_2$ of water in the second ink satisfy a relationship of $R_1 < R_2$.

According to the present invention, the ink jet recording method capable of recording a high-quality image in which a shift in color tone of a secondary color image recorded with a plurality of inks through use of a circulation serial head is reduced can be provided. In addition, according to the present invention, the ink jet recording apparatus to be used in the ink jet recording method can be provided.

Further features of the present invention will become apparent from the following description of exemplary embodiments with reference to the attached drawings.

BRIEF DESCRIPTION OF THE DRAWINGS

FIG. 4 is a schematic view for illustrating an arrangement example of ejection orifice arrays and an example of a circulation flow direction of an ink in the recording head.

FIG. 8A and FIG. 8B are each a schematic view for illustrating the flow state of an ink in the vicinity of the ejection orifice.

FIG. 9 is a sectional view for partially illustrating an example of the recording head.

DESCRIPTION OF THE EMBODIMENTS

The present invention is described in more detail below by way of exemplary embodiments. In the present invention, when a compound is a salt, the salt is present in a state of dissociating into ions in an ink, but the expression "contains the salt" is used for convenience. In addition, an aqueous ink for ink jet is sometimes simply described as "ink". A first flow path and a second flow path are sometimes collectively described as "flow path". Similarly, a first ink and a second ink are sometimes collectively described as "ink". A secondary color image recorded with two inks is sometimes simply described as "image". Physical property values are values at normal temperature (25° C.) unless otherwise stated.

<Ink Jet Recording Method and Ink Jet Recording Apparatus>

An ink jet recording apparatus of the present invention includes a recording head including: a plurality of ejection orifices each configured to eject an ink; an ejection element configured to generate energy for ejecting the ink; and a first flow path and a second flow path which communicate to each other between each of the plurality of ejection orifices and the ejection element and inside which the ink flows. The recording head is a recording head of a serial type (serial head) which includes an ejection element substrate including a plurality of ejection orifice arrays each having the plurality of ejection orifices arranged in a predetermined direction and which is scanned in a direction intersecting with an arrangement direction of the ejection orifice arrays. The first flow path and the second flow path are arranged in parallel to a scanning direction of the recording head and have the same flow direction of the ink. The ink jet recording apparatus of the present invention further includes a flow unit, which is separate from the ejection element, configured to flow the ink in the first flow path into the second flow path. In addition, an ink jet recording method of the present invention is, for example, a method including using the above-mentioned ink jet recording apparatus and recording an image by ejecting an ink from the above-mentioned recording head. That is, the ink jet recording method of the present invention includes: an ejection step of ejecting the ink from the plurality of ejection orifices; and a flow step, which is separate from the ejection step, of flowing the ink in the first flow path into the second flow path.

Figure 1:
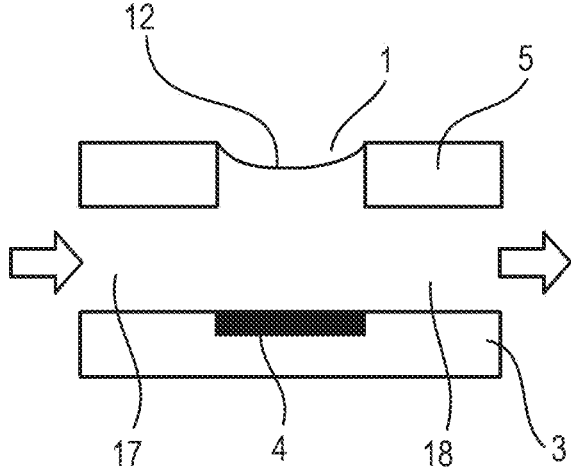
FIG. 1 is a schematic view for illustrating the state of a vicinity of an ejection orifice of a recording head.

FIG. 1 is a schematic view for illustrating the state of a vicinity of the ejection orifice of the recording head. The recording head illustrated in FIG. 1 includes: an ejection orifice 1 configured to eject an ink; an ejection element 4 configured to generate energy for ejecting the ink; and a first flow path 17 and a second flow path 18 which communicate to each other between the ejection orifice 1 and the ejection element 4 and inside which the ink flows. As described later in the description of an ejection element substrate of the recording head, the ejection orifice 1 is formed in an ejection orifice forming member 5, and the ejection element 4 is arranged in a substrate 3. The ink passes between the ejection orifice 1 and the ejection element 4 and flows from the first flow path 17 into the second flow path 18 (in a direction indicated by the arrows of FIG. 1). When the ink does not flow, evaporation of water from a meniscus 12 of the ink in the ejection orifice 1 proceeds, and along with this, the ink present between the ejection orifice 1 and the ejection element 4 is gradually thickened. Accordingly, when an ejection pause time is long, the ink may be hardly ejected owing to an increase in its fluid resistance at the time of the next ejection operation. Meanwhile, when the ink flows in the direction indicated by the arrows of FIG. 1, even in the case where water evaporates from the meniscus 12, the ink is successively supplied between the ejection orifice 1 and the ejection element 4 through a circulation flow, and hence the thickening of the ink is suppressed, with the result that the occurrence of a state in which the ink is hardly ejected can be prevented.

The inventors of the present invention have combined the recording head of a serial type configured to cause a circulation flow (circulation serial head) as illustrated in FIG. 1 and a plurality of inks, and recorded an image by ejecting the plurality of inks from the ejection orifices. As a result, even after an ejection operation was paused for a predetermined time period, the ejection stability of the ink was improved, and the frequency of a preliminary ejection operation performed during scanning of the recording head was able to be reduced. However, the inventors have found that there arises a new problem in that the change in color tone of a secondary color image recorded with the plurality of inks may occur under specific scanning conditions. The inventors have examined in detail the reasons for the occurrence of the change in color tone of the secondary color image, and as a result, have found that the following phenomena occur.

Figure 2:
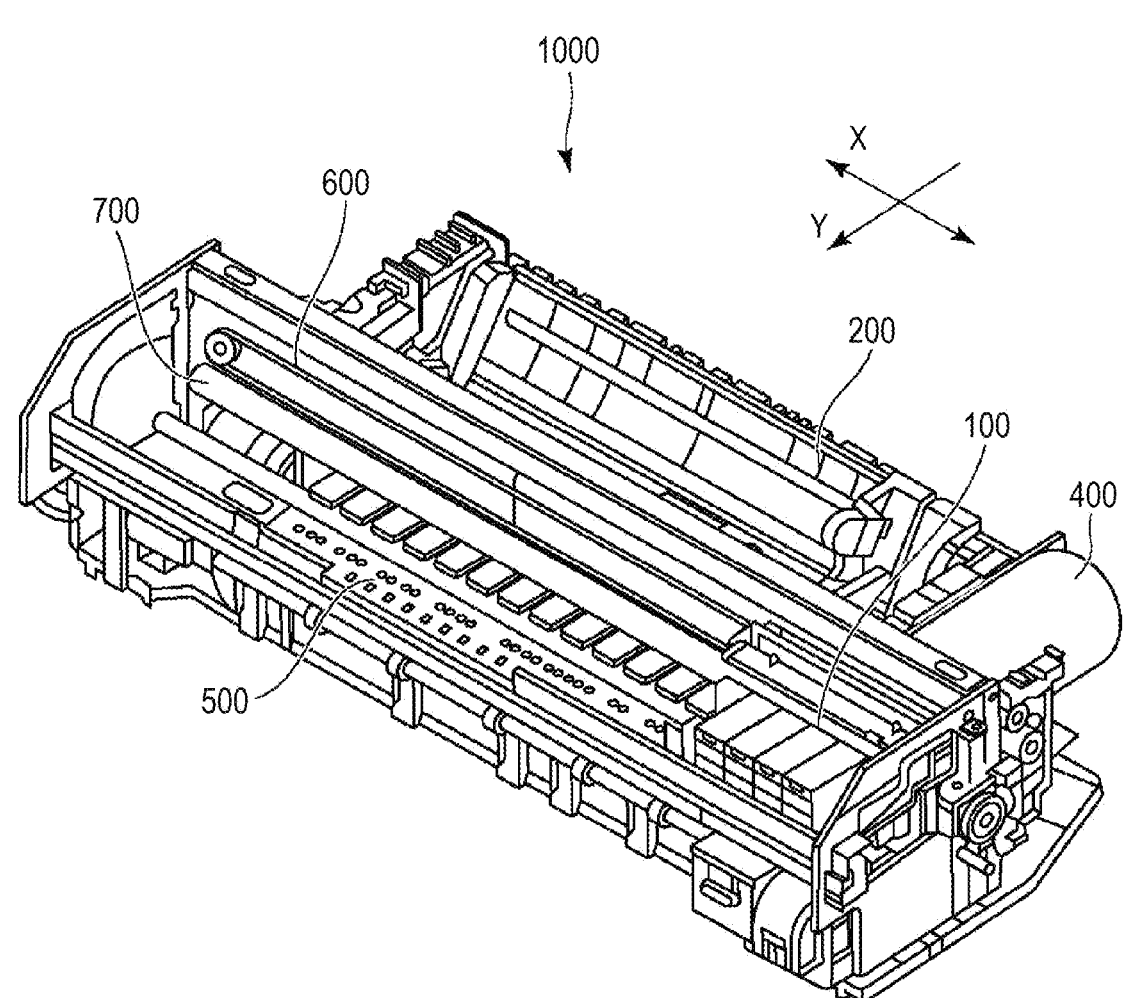
FIG. 2 is a perspective view for schematically illustrating an ink jet recording apparatus according to one embodiment.

The ink jet recording apparatus having the circulation serial head mounted thereon is described. FIG. 2 is a perspective view for schematically illustrating an ink jet recording apparatus 1000 according to one embodiment. A plurality of recording mediums can be loaded into a feed unit 200, and the recording mediums are each fed with a feed roller (not shown). A recording medium P (see FIG. 3A and FIG. 3B) of this embodiment is described by taking as an example a cut sheet having been cut into a predetermined size, but the present invention is not limited thereto and may also be adopted in a mode of recording on a roll sheet.

Figure 3A:
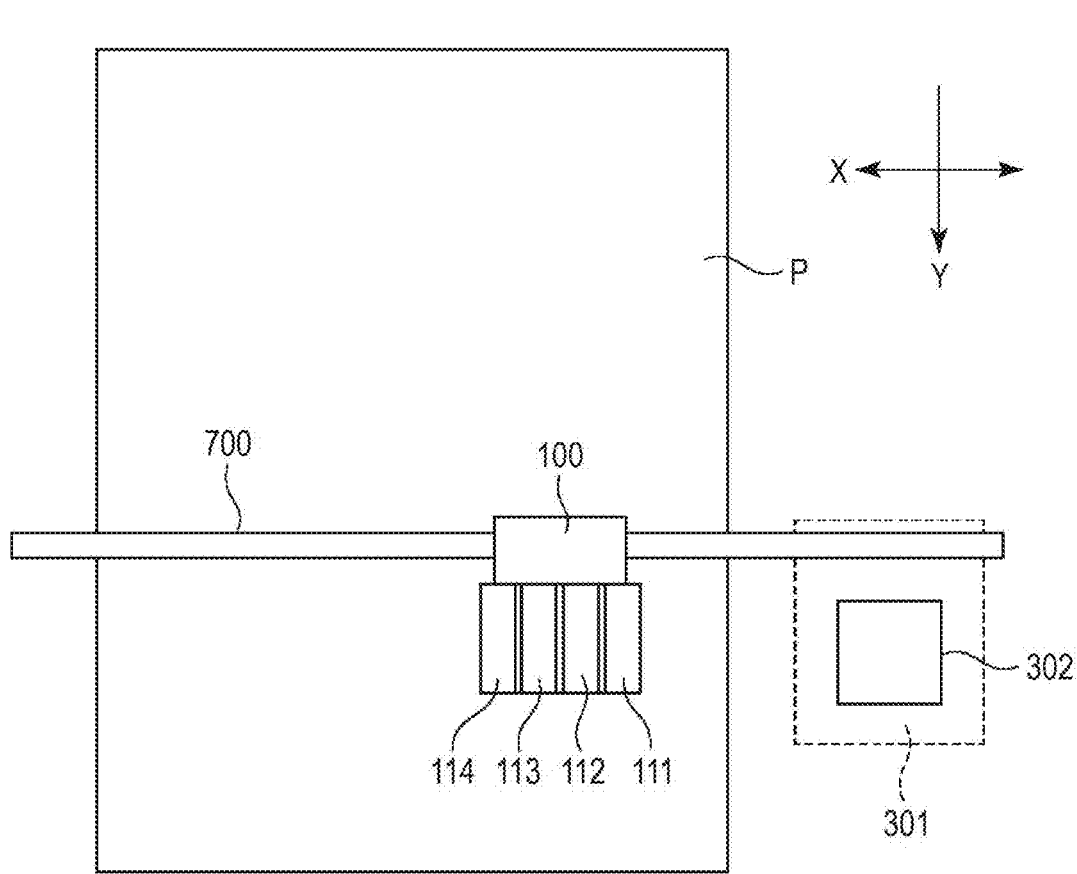
FIG. 3A and FIG. 3B are each a schematic view for illustrating an internal configuration of the ink jet recording apparatus.
Figure 3B:
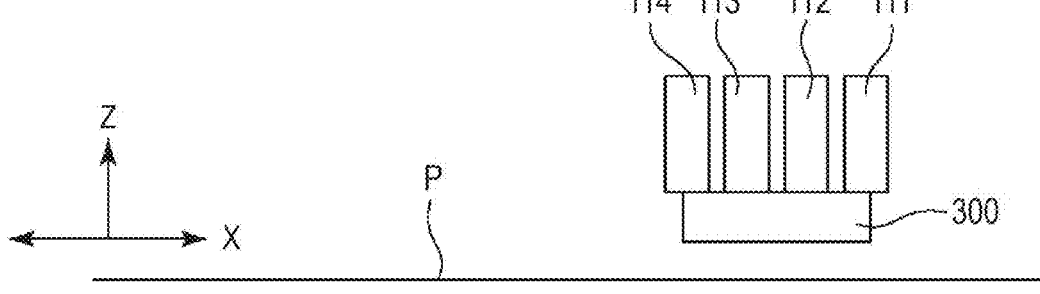

The recording medium fed by the feed unit 200 is conveyed in a Y direction (conveying direction) by a conveying unit including a conveying roller (not shown), and is moved to a recording position facing an ejection unit (recording head) 300 configured to eject an ink (see FIG. 3B). A carriage 100 has the ejection unit (recording head) 300 mounted thereon, and is reciprocally scanned in an X direction (main scanning direction) intersecting with the Y direction along a guide shaft 700 through a timing belt 600 by the driving of a carriage motor 400.

After an image is recorded on a unit area through the movement of the carriage 100 in the X direction and an ink ejection operation by the ejection unit (recording head) 300, the recording medium is conveyed in the Y direction by the conveying unit. The unit area may be arbitrarily set to, for example, "one band" that can be recorded by the arrangement width of the ejection orifice arrays arranged along the Y direction in the ejection unit 300 and one movement of the ejection unit 300 in the X direction, or "one" pixel corresponding to the resolution of the recording head. With the recording head of a serial type, an image can be recorded on the entire recording medium through a recording operation in which an ink ejection operation of one band and an intermittent conveying operation are repeated. In this embodiment, the X direction and the Y direction are orthogonal to each other.

In addition, a platen 500 configured to support the recording medium from a vertically downward direction is arranged in a recording region which is located at a position facing the ejection unit (recording head) 300 and in which recording is performed by the ejection unit (recording head) 300. With the platen 500, a recording surface of the recording medium and an ejection orifice surface 2 (FIG. 6) of the ejection unit (recording head) 300 having arranged therein the ejection orifices each configured to eject an ink are kept at a predetermined distance.

FIG. 3A and FIG. 3B are each a schematic view for illustrating an internal configuration of the ink jet recording apparatus 1000 according to one embodiment of the present invention. FIG. 3A is a schematic top view of the recording apparatus 1000 when seen from above, and FIG. 3B is a schematic side view of the recording apparatus 1000 when seen from front. The carriage 100 has detachably mounted thereon an ink cartridge configured to store an ink to be supplied to the ejection unit (recording head) 300. The ink cartridges 111, 112, 113 and 114 correspond to ejection orifice arrays 21, 22, 23 and 24 (see FIG. 4), respectively, and are configured to supply an ink to the respective ejection orifice arrays. For example, ejection orifice arrays and ink cartridges corresponding to respective colors of cyan, magenta, yellow and black (CMYK) are arranged.

In addition, a cap 302 for capping the ejection orifice surface 2 of the ejection unit (recording head) 300 is arranged within the movement region of the carriage 100 and outside the region (recording region) through which the recording medium P passes. The position of the carriage 100 (the ejection unit (recording head) 300) at which the ejection orifice surface 2 of the ejection unit (recording head) 300 faces the cap 302 is also referred to as "home position 301". The cap 302 is connected to a suction unit (not shown), and when the suction unit is driven under a state in which the ejection orifice surface 2 is capped, the ink is sucked from the ejection unit (recording head) 300.

FIG. 4 is a schematic view for illustrating an arrangement example of the ejection orifice arrays in the ejection unit (recording head) 300 and an example of a circulation flow direction, which is the flow direction of an ink. A state in which the ejection unit (recording head) 300 illustrated in FIG. 3B is seen from a recording medium P side is illustrated in FIG. 4. As illustrated in FIG. 4, the ejection unit (recording head) 300 is a recording head of a serial type that includes an ejection element substrate 10 including the four ejection orifice arrays 21, 22, 23 and 24, and is scanned in the X direction intersecting with the arrangement direction of the ejection orifice arrays 21 to 24. In addition, all the four ejection orifice arrays 21 to 24 have the same circulation flow direction from right to left, which is parallel to the X direction (scanning direction). The ejection unit (recording head) 300 is reciprocally moved in a forward direction from left to right and in a backward direction from right to left. Accordingly, the scanning direction and the circulation flow direction are the same direction at the time of the backward direction and reverse directions at the time of the forward direction.

Next, a site at which the change in color tone of the secondary color image recorded with the plurality of inks occurs and reasons for the occurrence are described. The inventors of the present invention have recorded a secondary color solid image on a recording medium by single pass by using the above-mentioned ink jet recording apparatus and the two ejection orifice arrays 23 and 24 (the ejection orifice array 24 and the ejection orifice array 23 arranged on a relatively upstream side and on a relatively downstream side, respectively, with respect to the flow direction of an ink). Specifically, the recording was performed as described below while the ejection unit (recording head) 300 was reciprocally scanned. The following operations were repeatedly performed: first, an image of one band was recorded on the recording medium in the forward direction of the X direction in the order of the ejection orifice array 24 and the ejection orifice array 23; the recording medium was then conveyed by one band in the Y direction; and an image was recorded on the recording medium in the backward direction of the X direction in the order of the ejection orifice array 23 and the ejection orifice array 24. As a result, when the secondary color solid image was recorded, its color tone at the beginning of recording and its color tone after long-time recording differed from each other in some cases. The inventors have observed in detail the secondary color solid image recorded on the recording medium with pigment inks at the beginning of recording and after long-time recording. As a result, the inventors have found that a shift in color tone of the secondary color image results from the fact that, in recording in the forward direction, a dot formed of an ink droplet ejected from the ejection orifice array 24 on an upstream side has a darker color than a dot formed of an initial ink droplet. The inventors have presumed the reasons for the occurrence of such phenomena to be as described below.

Figure 5A:
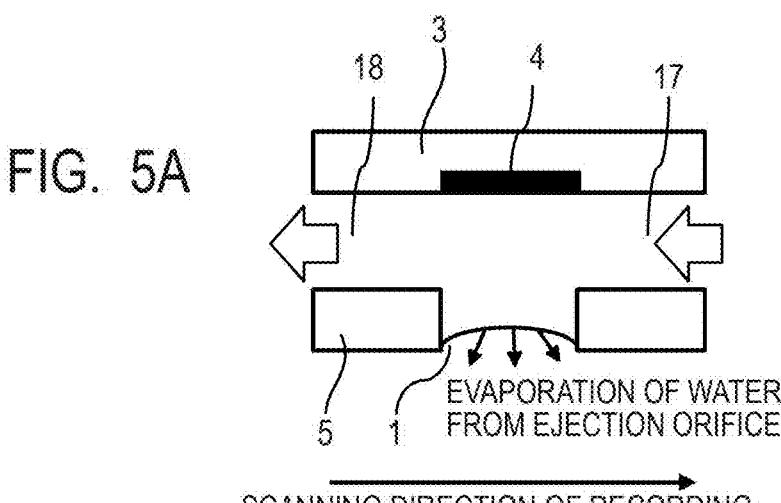
FIG. 5A, FIG. 5B, FIG. 5C and FIG. 5D are each a schematic view for illustrating the state of an ink in an ejection orifice on a downstream side in the recording head during scanning of the recording head.
Figure 5A:
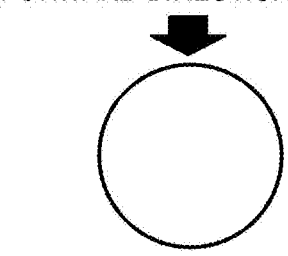
Figure 5B:
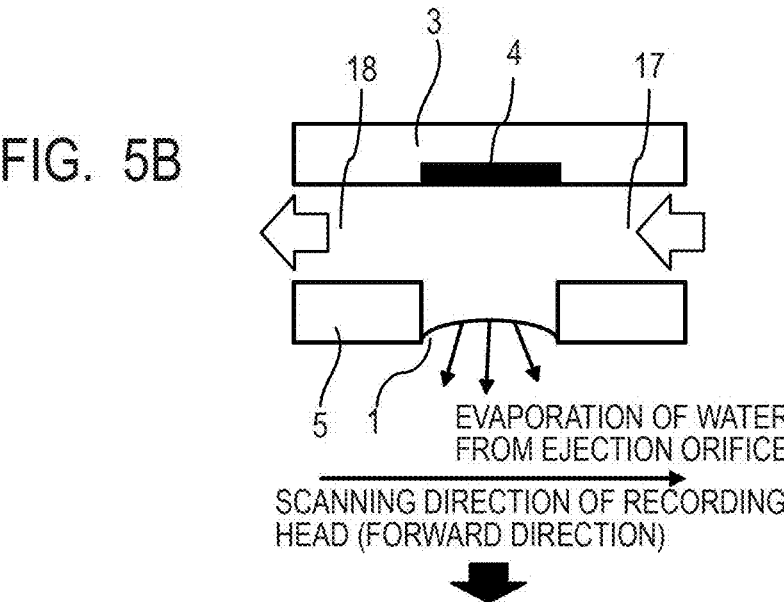
Figure 5B:
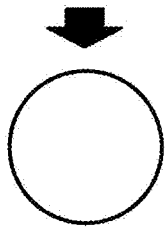
Figures 5C, 5D:
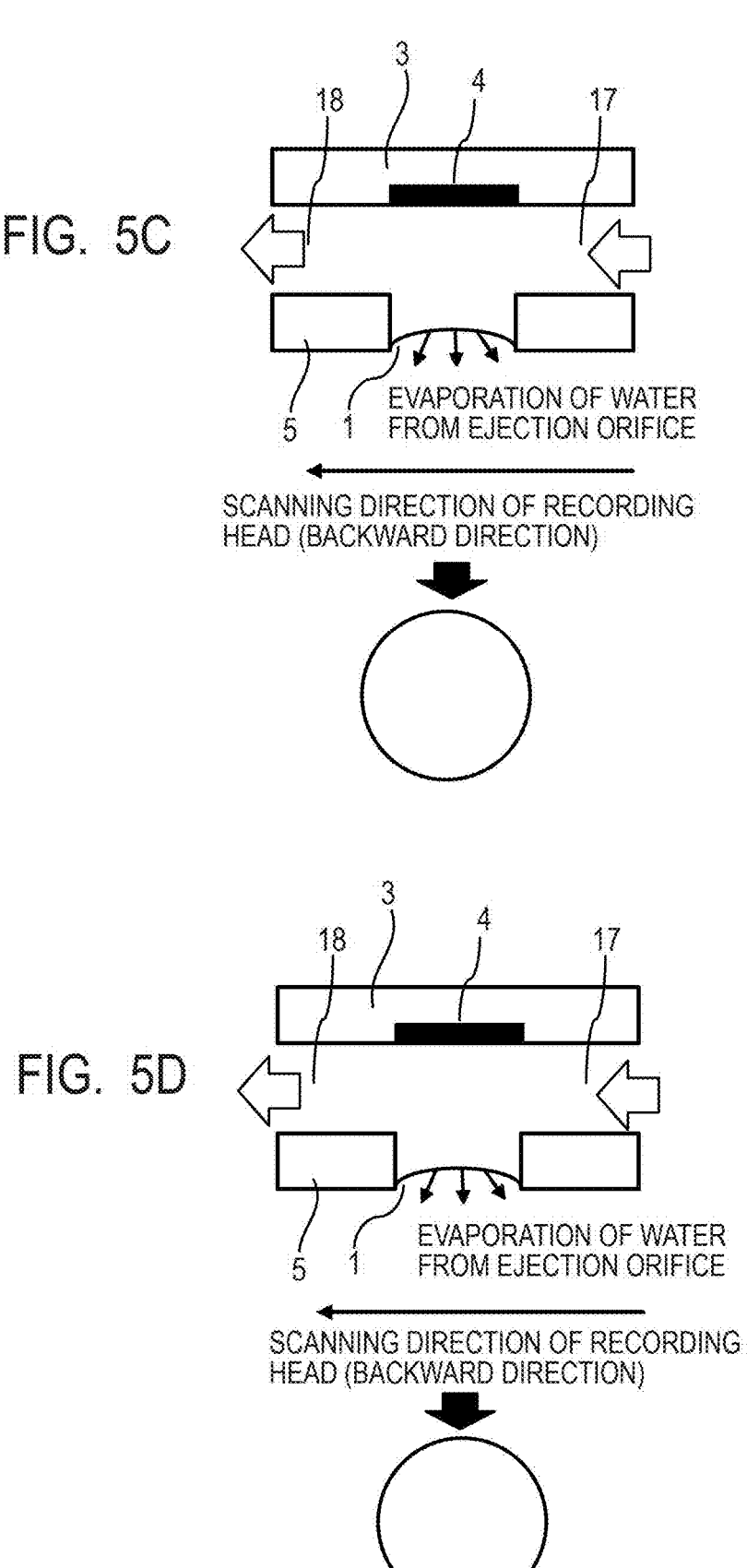

FIG. 5A to FIG. 5D are each a schematic view for illustrating the state of an ink ejected from the ejection orifice 1 of the ejection orifice array 23 on a downstream side with respect to the flow direction of an ink (circulation flow direction) or an ink ejected from the ejection orifice 1 of the ejection orifice array 24 on an upstream side with respect thereto in the recording head during scanning of the recording head. FIG. 5A is a schematic view for illustrating the state of the ink ejected from the ejection orifice 1 of the ejection orifice array 23 on a downstream side when the recording head is scanned in the forward direction, and FIG. 5B is a schematic view for illustrating the state of the ink ejected from the ejection orifice 1 of the ejection orifice array 24 on an upstream side when the recording head is scanned in the forward direction. In addition, FIG. 5C is a schematic view for illustrating the state of the ink ejected from the ejection orifice 1 of the ejection orifice array 23 on a downstream side when the recording head is scanned in the backward direction, and FIG. 5D is a schematic view for illustrating the state of the ink ejected from the ejection orifice 1 of the ejection orifice array 24 on an upstream side when the recording head is scanned in the backward direction.

As illustrated in FIG. 5A and FIG. 5B, when the scanning direction of the recording head and the circulation flow direction of the ink are reversed, a contact time period between the ink in the meniscus and air in the recording apparatus having a relatively lower humidity than that of the vicinity of the recording head is prolonged particularly in the ejection orifice array 24, which ejects the ink in advance. Accordingly, evaporation of water in the ink proceeds from the meniscus of the ejection orifice array 24 on an upstream side, and the ink flowing in a circulation path is concentrated. Such tendency becomes remarkable after long-time recording, and the ink in the ejection orifice array 24 on an upstream side is more concentrated than the ink in the ejection orifice array 23 on a downstream side. As a result, the color tone of the secondary color solid image recorded with the inks ejected from the ejection orifice arrays 23 and 24 differs from that at the beginning of recording, and a shift in color tone occurs.

Meanwhile, as illustrated in FIG. 5C and FIG. 5D, when the scanning direction of the recording head and the circulation flow direction of the ink are the same, a difference in evaporation amount of water from the meniscus is less liable to occur between ejection orifice arrays, and a difference in degree of concentration of the ink is less liable to occur between the ejection orifice array 23 and the ejection orifice array 24. As described above, it is conceived that the shift in color tone of the secondary color image occurs because a difference in degree of concentration of the ink between the ejection orifice arrays occurs particularly between recording in a forward direction and recording in a backward direction after long-time recording. It has been found that such color unevenness is difficult to recognize in the case of a dye ink, but remarkably occurs in the case of a pigment ink.

The inventors of the present invention have made investigations on a method of suppressing the above-mentioned shift in color tone of the secondary color image. Specifically, the inventors have made investigations on measures to suppress the evaporation speed of water in the ink from the ejection orifice array on an upstream side, the ink being first brought into contact with air, in the case where the recording head is scanned in a forward direction, that is, the circulation flow direction of the ink and the scanning direction of the recording head are reversed. As a result, the inventors have found that the shift in color tone of the secondary color image can be suppressed when the molar fraction of water in the ink ejected from the ejection orifice array on an upstream side with respect to the flow direction of the ink is set to be lower than the molar fraction of water in the ink ejected from the ejection orifice array on a downstream side with respect thereto.

As used herein, of the plurality of ejection orifice arrays in the recording head, an ink ejection orifice array arranged on an upstream side with respect to the flow direction of the ink is sometimes described as "first ejection orifice array", and an ink ejected from the first ejection orifice array is sometimes described as "first ink". In addition, an ink ejection orifice array arranged on a downstream side with respect to the flow direction of the ink is sometimes described as "second ejection orifice array", and an ink ejected from the second ejection orifice array is sometimes described as "second ink". The "upstream side" and "downstream side" with respect to the flow direction of the ink in the plurality of ejection orifice arrays mean a relative relationship between two ejection orifice arrays to be compared.

The inventors of the present invention have presumed the reasons why a high-quality image in which the shift in color tone of the secondary color image is reduced can be recorded when a molar fraction $R_1$ of water in the first ink and a molar fraction $R_2$ of water in the second ink satisfy the relationship of $R_1 < R_2$ as described above to be as described below.

When the molar fraction of water is low, the evaporation speed of water is slow, and hence the ink is less liable to be concentrated. Accordingly, it is conceived that, when the molar fraction $R_1$ of water in the first ink on an upstream side is lower than the molar fraction $R_2$ of water in the second ink on a downstream side, a difference in evaporation amount of water between the first ink and the second ink is suppressed, and hence the shift in color tone of the secondary color image is suppressed.

Figure 6:
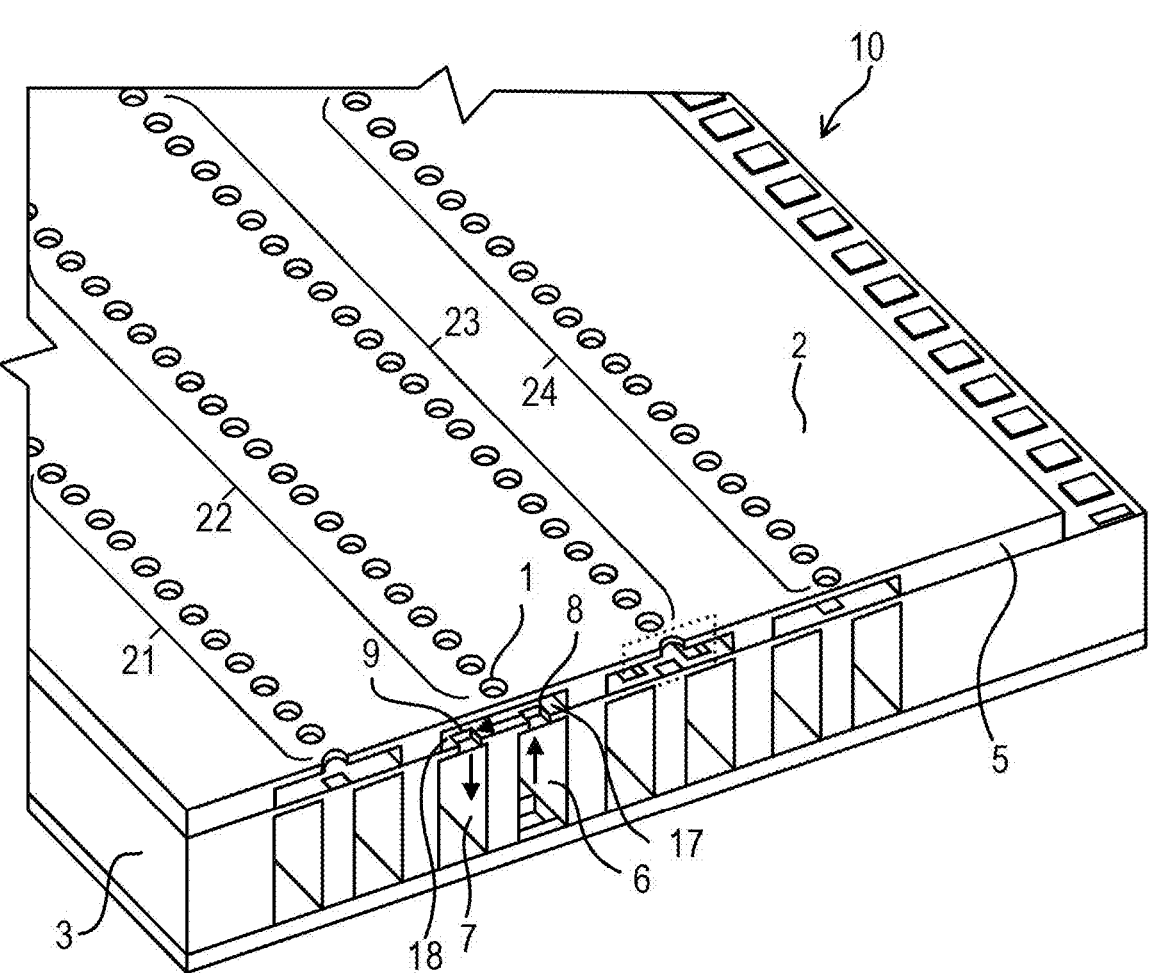
FIG. 6 is a perspective view for illustrating a cross-section of an ejection element substrate.
Figure 7:
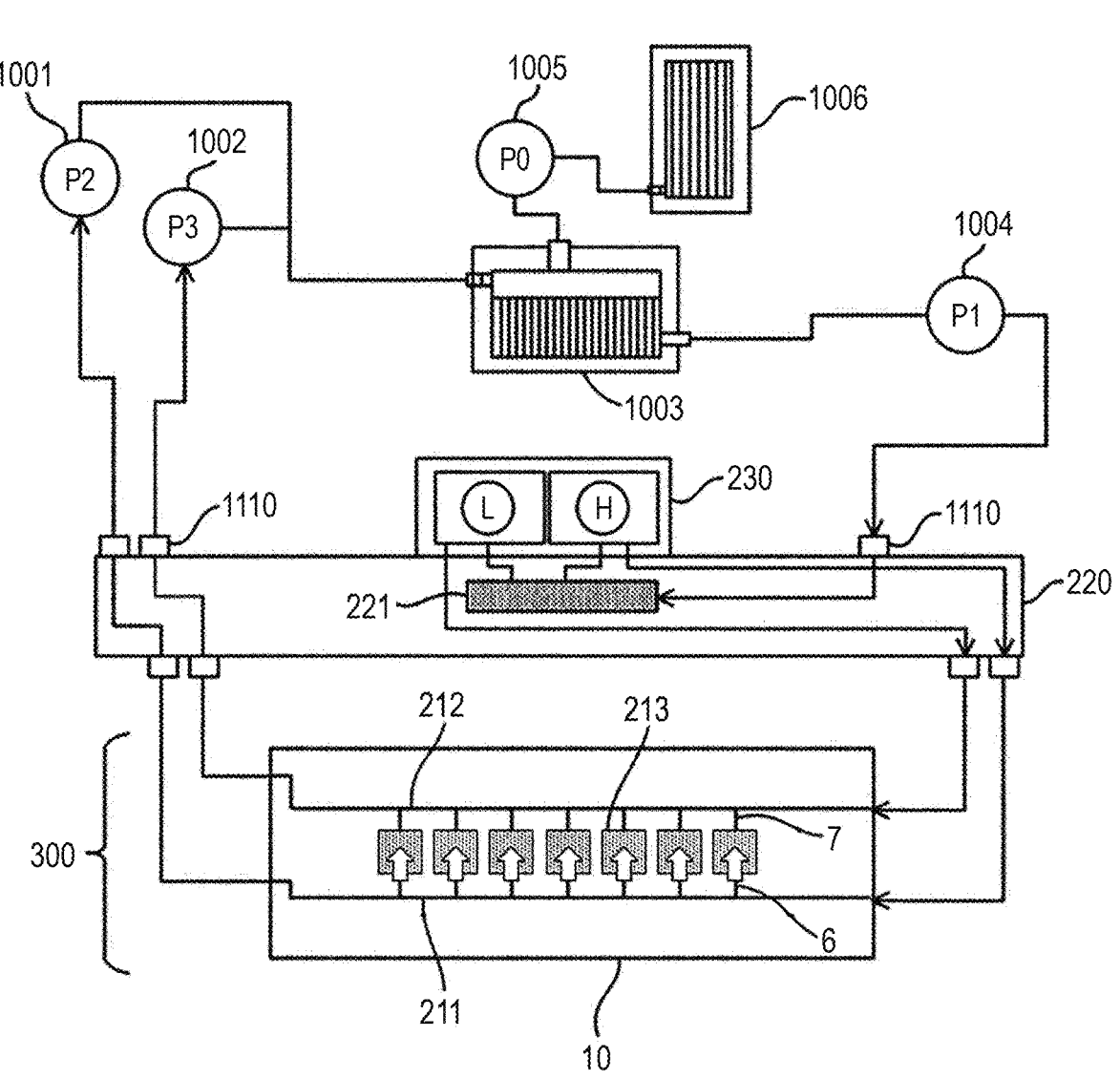
FIG. 7 is a schematic view for illustrating an ink supply system.

FIG. 6 is a perspective view for illustrating a cross-section of the ejection element substrate. As illustrated in FIG. 6, the ejection element substrate 10 includes: the ejection orifice forming member 5 having formed therein the ejection orifices 1; and the substrate 3 having arranged therein an ejection element (not shown). The lamination of the ejection orifice forming member 5 and the substrate 3 forms the first flow path 17 and the second flow path 18 through which the ink flows. The first flow path 17 is a region from an inflow port 8, into which the ink in an inflow path 6 flows, to a portion between each of the ejection orifices 1 and the ejection element (FIG. 7, a liquid chamber 213). In addition, the second flow path 18 is a region from the portion between the ejection orifice 1 and the ejection element (FIG. 7, the liquid chamber 213) to an outflow port 9 from which the ink flows out to an outflow path 7. For example, when a pressure difference is made between the inflow port 8 and the outflow port 9 like the inflow port 8 having a high pressure and the outflow port 9 having a low pressure, the ink can be flowed from the high pressure to the low pressure (in a direction indicated by the arrows in FIG. 6). The ink that has passed the inflow path 6 and the inflow port 8 enters the first flow path 17. Then, the ink that has passed through the portion between the ejection orifice 1 and the ejection element (FIG. 7, the liquid chamber 213) passes through the second flow path 18 and the outflow port 9 and flows into the outflow path 7.

The flow step of flowing the ink in the first flow path into the second flow path is a step separate from (a step different from) the ejection step of ejecting the ink from the ejection orifice. In addition, the flowing of the ink from the first flow path into the second flow path in the flow step is preferably performed separately from the loading of the ink between the ejection orifice and the ejection element. The flow step is preferably a step of flowing the ink in the first flow path into the second flow path without discharging the ink from the ejection orifice. The discharge of the ink from the ejection orifice includes a recovery operation, such as preliminary ejection or suction. During the recovery operation of the recording head, the flowing of the ink from the first flow path into the second flow path may be stopped. Further, in the flow step, the ink is preferably flowed from the first flow path into the second flow path by the flow unit, which is separate from the ejection element.

Further details about the ink jet recording method and ink jet recording apparatus of the present invention are described below by taking as an example a recording head of a thermal system configured to eject an ink by generating air bubbles through utilization of an ejection element configured to generate thermal energy. However, even a recording head of a piezo system or a recording head adopting any other ejection system can be applied to the ink jet recording method and ink jet recording apparatus of the present invention. Herein, the description is made by taking as an example a mode of circulating an ink between an ink storage portion and the recording head, but any other mode may be adopted. For example, the following mode may be adopted: two ink storage portions are arranged on the upstream side and downstream side of the recording head, and an ink is flowed from one of the ink storage portions to the other ink storage portion. Further, the description is made by taking as an example a recording head having incorporated therein an ejection element substrate in which four ejection orifice arrays capable of ejecting inks of four colors of CMYK are arranged, but a recording head including ejection orifice arrays capable of ejecting two or more kinds of inks may be used. In the present invention, a recording head configured to eject an ink by a thermal system is particularly preferably used.

In the flow step, it is preferable that the ink be continuously flowed or intermittently flowed. Details about a method of continuously flowing the ink and a method of intermittently flowing the ink are described below. First, with reference to FIG. 7, the method of continuously flowing the ink is described. FIG. 7 is a schematic view for illustrating an ink supply system. The ejection unit (recording head) 300 illustrated in FIG. 7 is connected to a first circulation pump (high-pressure side) 1001, a first circulation pump (low-pressure side) 1002, a sub tank 1003, a second circulation pump 1004 and the like. For simplification of the description, only a flow path for an ink of one color is illustrated in FIG. 7, but in actuality, flow paths for four colors of CMYK are each arranged in the ejection unit (recording head) 300.

The sub tank 1003 connected to a main tank 1006 serving as an ink storage portion has an air communication port (not shown) and hence can discharge air bubbles mixed into an ink to the outside. The sub tank 1003 is also connected to a replenishment pump 1005. The ink is consumed in the ejection unit (recording head) 300 by the ejection (discharge) of the ink from the ejection orifice in, for example, image recording or suction recovery. The replenishment pump 1005 transfers the ink corresponding to the consumed amount from the main tank 1006 to the sub tank 1003.

The first circulation pump (high-pressure side) 1001 and the first circulation pump (low-pressure side) 1002 each flow the ink in the ejection unit (recording head) 300 that has been flowed out of a connection portion 1110 to the sub tank 1003. A positive-displacement pump having a quantitative liquid-delivering ability is preferably used as each of the first circulation pump (high-pressure side) 1001 and the first circulation pump (low-pressure side) 1002. Specific examples of such positive-displacement pump may include a tube pump, a gear pump, a diaphragm pump and a syringe pump. At the time of the driving of each of the ejection unit 300, the ink can be flowed into a common inflow path 211 and a common outflow path 212 by the first circulation pump (high-pressure side) 1001 and the first circulation pump (low-pressure side) 1002.

A negative pressure control unit 230 includes two pressure adjusting mechanisms in which control pressures different from each other are set. A pressure adjusting mechanism (high-pressure side) H and a pressure adjusting mechanism (low-pressure side) L are connected to the common inflow path 211 and the common outflow path 212 in the ejection unit 300 via a supply unit 220 having arranged therein a filter 221 that removes foreign matter from an ink, respectively.

The supply unit 220 and the ejection unit (recording head) 300 are connected to each other via an ink supply tube (not shown) serving as an ink supply path. The ejection unit (recording head) 300 is subjected to reciprocal scanning in the ink jet recording apparatus, and hence the ink supply tube is formed of a resin material having such flexibility as to be capable of withstanding the reciprocal scanning.

The ejection unit 300 has arranged therein the common inflow path 211, the common outflow path 212, and the inflow path 6 and the outflow path 7 that communicate to the liquid chamber 213 serving as a portion between each of the ejection orifices 1 and the ejection element (not shown). The inflow path 6 and the outflow path 7 communicate to the common inflow path 211 and the common outflow path 212. Accordingly, a flow (arrow in FIG. 7) in which part of the ink passes the inside of the liquid chamber 213 from the common inflow path 211 to flow into the common outflow path 212 occurs. The arrows in FIG. 6 indicate the flow of the ink in the liquid chamber 213. That is, as illustrated in FIG. 6, the ink in the first flow path 17 flows into the second flow path 18 via a space between the ejection orifice 1 and the ejection element.

As illustrated in FIG. 7, the pressure adjusting mechanism H is connected to the common inflow path 211 and the pressure adjusting mechanism L is connected to the common outflow path 212. Accordingly, a pressure difference occurs between the inflow path 6 and the outflow path 7. Thus, a pressure difference also occurs between the inflow port 8 (FIG. 6) communicating to the inflow path 6 and the outflow port 9 (FIG. 6) communicating to the outflow path 7. When the ink is flowed by the pressure difference between the inflow port and the outflow port, the flow speed (mm/s) of the ink at the time of the flowing is preferably controlled to 1.0 mm/s or more to 100.0 mm/s or less. When the flow speed of the ink is 1.0 mm/s or more, a suppressing effect on thickening by the circulation flow of the ink is easily exhibited, and hence the shift in color tone of the secondary color image at the beginning of recording and after long-time recording is easily suppressed. Meanwhile, when the flow speed of the ink is 100.0 mm/s or less, evaporation of water from the ejection orifice is easily suppressed, and hence the shift in color tone of the secondary color image at the beginning of recording and after long-time recording is easily suppressed.

In the ink jet recording method of the present invention, the ink in the first flow path may be flowed into the second flow path even during a recovery operation of the recording head. When the ink flows during the recovery operation of the recording head, the ink constantly flows. When the ink constantly flows, water is liable to evaporate, and hence the concentration of the circulating ink is liable to be increased. To suppress the increase in concentration of the ink, it is preferable that a mechanism for adding water to the ink by the elapse of a predetermined time period be arranged in the ink jet recording apparatus. Further, it is preferable that a detector for detecting the concentration of the ink be arranged in the ink jet recording apparatus, and water be added to the ink in conjunction with an increase in concentration of the ink having been detected.

FIG. 8A and FIG. 8B are each a schematic view for illustrating the flow state of an ink in the vicinity of the ejection orifice. The flow state of the ink in the vicinity of the ejection orifice is roughly divided into two kinds: the first one is such a flow state as illustrated in FIG. 8A in which no circulation flow occurs in the vicinity of the meniscus 12 in the ejection orifice 1; and the second one is such a flow state as illustrated in FIG. 8B in which a circulation flow occurs in the vicinity of the meniscus 12 in the ejection orifice 1. Even when the flow speed of the ink in the flow path is comparable, the flow state of the ink in the vicinity of the meniscus 12 may not be constant. It is conceived that which flow state the ink is in depends on a thickness (c) of the ejection orifice forming member 5, a height (d) of the flow path (each of the first flow path 17 and the second flow path 18) and a diameter (e) of the ejection orifice 1, rather than the flow speed of the ink in the flow path. For example, when the height (d) of the flow path and the diameter (e) of the ejection orifice 1 are comparable to each other, in the case where the thickness (c) of the ejection orifice forming member 5 is large, the circulation flow is likely to occur in the vicinity of the meniscus 12 as illustrated in FIG. 8B.

Figure 9:
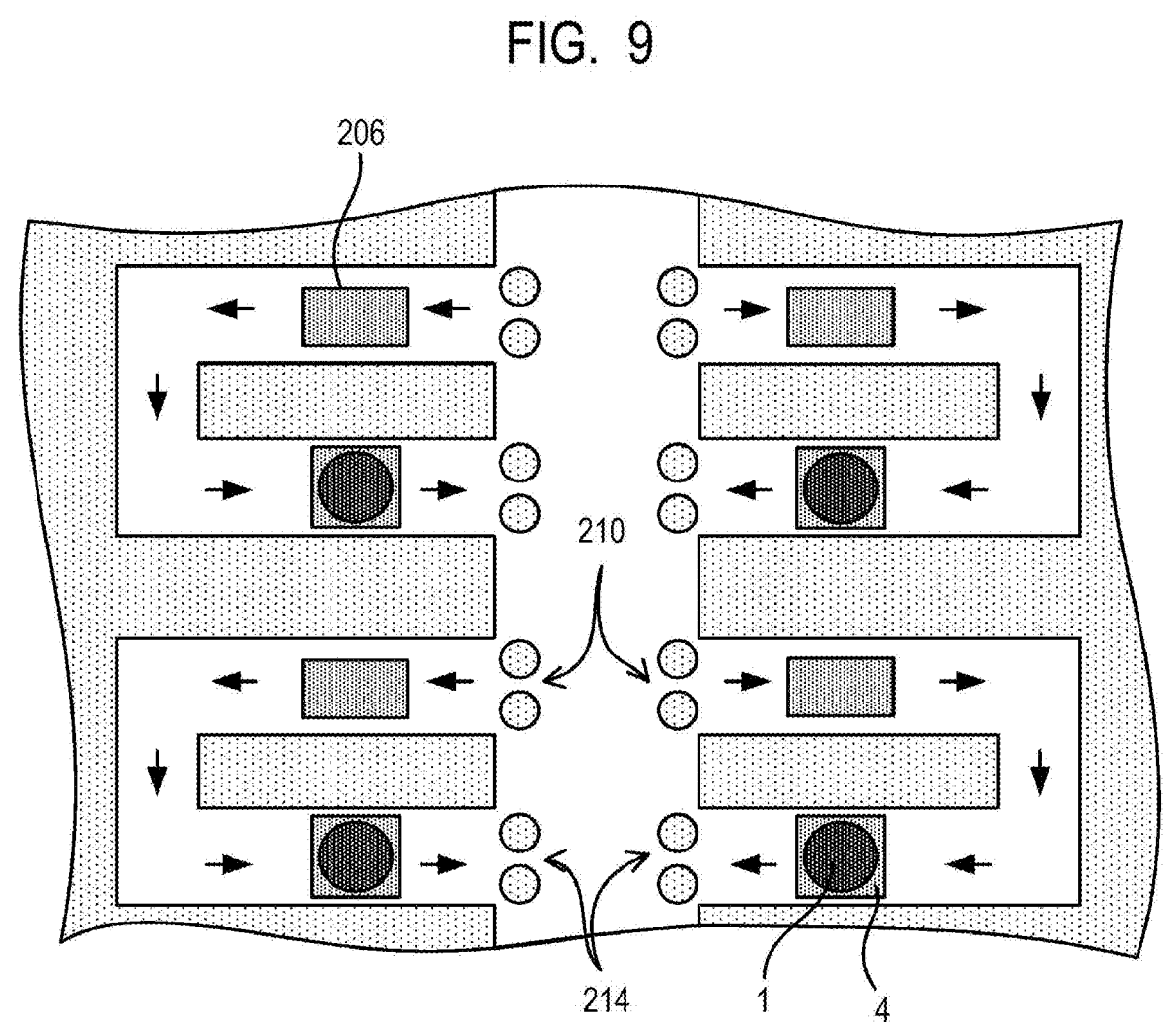

Next, with reference to FIG. 9, the method of intermittently flowing the ink is described. FIG. 9 is a sectional view for partially illustrating an example of the recording head. As illustrated in FIG. 9, the ink, which has flowed in from an inflow port 210, flows in a direction indicated by the arrows by the action of a circulation pump 206 serving as a unit for flowing the ink, and flows out from an outflow port 214. In addition, the circulation pump 206 is a pump capable of intermittently flowing the ink. Accordingly, the ink can be intermittently flowed between the ejection orifice 1 and the ejection element 4 by driving the circulation pump 206.

The ink jet recording apparatus of the present invention preferably includes a unit configured to adjust the temperature of the ink in the recording head. In addition, the ink jet recording method of the present invention may further include a step of warming the ink in the recording head. The temperature of the ink in the recording head may be adjusted, for example, by a unit configured to control the temperature of the recording head. Examples of the unit configured to control the temperature of the recording head may include: a heater for temperature adjustment arranged in direct contact with the recording head; and a heater for ink ejection. When the temperature of the recording head is controlled (heated or warmed) by the heater for ink ejection, for example, a current to the extent that the ink is prevented from being ejected may be repeatedly applied. The temperatures of the recording head and the ink in the recording head may be read, for example, with a temperature sensor arranged in the recording head. The temperature of the ink in the recording head is preferably adjusted within the range of 40° C. or more to 60° C. or less.

In the case of warming the ink, the viscosity of the ink is likely to be reduced along with an increase in temperature, and hence the ink easily flows in the vicinity of the ejection orifice. As a result, evaporation of water from the ejection orifice is suppressed, and hence the shift in color tone of the secondary color image is more easily suppressed.

In the ink jet recording method of the present invention, the scanning speed of the recording head during recording of an image, that is, the moving speed of the recording head during scanning may be set to preferably 30 inches/see or more, more preferably 35 inches/see or more from the viewpoint of an increase in recording speed. In addition, the moving speed of the recording head during scanning is preferably set to 70 inches/see or less. When the moving speed of the recording head during scanning is 70 inches/see or less, evaporation of water from the ejection orifice is easily suppressed, and evaporation of water during recording in a forward direction with the first ink is easily suppressed. As a result, the shift in color tone of the secondary color image is more easily suppressed.

In the recording head to be used in the ink jet recording method of the present invention, a distance between the first ejection orifice array and the second ejection orifice array may be set to 1.8 mm or less. Any other ejection orifice array may be arranged between the first ejection orifice array and the second ejection orifice array, or the first ejection orifice array and the second ejection orifice array may be adjacent to each other. When the distance between the ejection orifice arrays is short, the ejection orifice arrays can be arranged densely, and hence downsizing and an increase in image quality are easily achieved. In addition, when the distance between the ejection orifice arrays is short, humidity in the vicinity of the ejection orifice arrays is easily increased. Accordingly, when the distance between the first ejection orifice array and the second ejection orifice array is set to 1.8 mm or less, the shift in color tone of the secondary color image can be further suppressed by setting the molar fraction $R_1$ of water in the first ink and the molar fraction $R_2$ of water in the second ink to satisfy the relationship of $R_1<R_2$. The distance between the first ejection orifice array and the second ejection orifice array is set to preferably 0.1 mm or more, more preferably 0.5 mm or more.

The ink jet recording method of the present invention includes a step of recording an image with the above-mentioned ink jet recording apparatus (recording step). In the recording step, specifically, the image is recorded by applying the inks ejected from the ejection orifices of the recording head to the recording medium. Any medium may be used as the recording medium on which the image is to be recorded. Of such mediums, such sheets of paper each having permeability as described below are preferably used: a recording medium free of any coating layer, such as plain paper or uncoated paper; and a recording medium including a coating layer, such as glossy paper or art paper.

The ink jet recording method of the present invention may be free of a step of heating the recording medium to which the ink has been applied through the recording step (heating step). It is conceived that, when the recording medium to which the ink has been applied is heated, a temperature in a main body of the apparatus is increased along with the heating step, and evaporation of water from the meniscus in the recording head is liable to proceed. Thus, the above-mentioned heating step may not be performed so that the shift in color tone of the secondary color image is easily suppressed by reducing an influence from an increase in temperature.

<Ink>

The ink jet recording method of the present invention includes a step of recording an image, through use of a plurality of inks, by applying the inks ejected from the ejection orifices of the recording head to a recording medium. The plurality of inks (ink set) includes the first ink to be ejected from an ejection orifice array (first ejection orifice array) arranged on an upstream side with respect to the flow direction of each of the inks and the second ink to be ejected from an ejection orifice array (second ejection orifice array) arranged on a downstream side with respect thereto. In addition, the first ink and the second ink are each an aqueous ink containing a pigment. Further, the molar fraction $R_1$ of water in the first ink and the molar fraction $R_2$ of water in the second ink satisfy the relationship of $R_1<R_2$.

Within the range in which the molar fraction $R_1$ of water in the first ink and the molar fraction $R_2$ of water in the second ink satisfy the relationship of $R_1 < R_2$, the values (%) of $R_1$ and $R_2$ are each preferably 90.0% or more. A difference in molar fraction of water between the first ink and the second ink, $(R_2 - R_1)$, preferably satisfies the relationship of $0.5(\%) \leq R_2 - R_1 \leq 5.0(\%)$, and more preferably satisfies the relationship of $1.0(\%) \leq R_2 - R_1 \leq 3.0(\%)$.

In the present invention, the molar fraction of water refers to a value calculated with respect to components (compounds) present in an ink. The molar fraction of water is preferably 85.0% or more to 99.5% or less, more preferably 90.0% or more to 99.0% or less. Specifically, the molar fraction of water in an ink is specifically calculated in accordance with the expression: [(number of moles of water)/(number of moles of water+number of moles of compounds present in ink)]×100(%), in the ink. For calculation of the number of moles, a molecular weight may be used, and a weight-average molecular weight may be used in the case of a polymer such as a water-soluble resin. In addition, in the case of a compound having a molecular weight as high as about several millions, such as a pigment, calculation may be performed by setting the molecular weight to a predetermined value such as "a million" for convenience. This is because a compound having a sufficiently high molecular weight has less influence on the molar fraction of water in an aqueous ink for ink jet.

Constituent components of each of the first ink and the second ink and the physical properties of each of the inks are described in detail below.

(Coloring Material)

The ink contains a pigment as a coloring material. The content (% by mass) of the pigment in the ink is preferably 0.10% by mass or more to 15.00% by mass or less, more preferably 0.30% by mass or more to 10.00% by mass or less with respect to the total mass of the ink.

Specific examples of the pigment may include: inorganic pigments, such as carbon black and titanium oxide; and organic pigments, such as azo, phthalocyanine, quinacridone, isoindolinone, imidazolone, diketopyrrolopyrrole and dioxazine pigments. Of those, carbon black and organic pigments are preferable.

A resin-dispersed pigment using a resin as a dispersant, a self-dispersible pigment, which has a hydrophilic group bonded to its particle surface, or the like may be used as a dispersion system for the pigment. In addition, a resin-bonded pigment having a resin-containing organic group chemically bonded to its particle surface, a microcapsule pigment, which contains a particle whose surface is covered with, for example, a resin, or the like may be used. Of those, a resin-dispersed pigment is more preferable from the viewpoint of an ejection property.

A dispersant that can disperse the pigment in an aqueous medium through the action of an anionic group is preferably used as a resin dispersant for dispersing the pigment in the aqueous medium. Such a resin as described later, in particular, a water-soluble resin may be used as the resin dispersant. The mass ratio of the content (% by mass) of the pigment in the ink to the content of the resin dispersant therein is preferably 0.3 times or more to 10.0 times or less.

A pigment having an anionic group, such as a carboxylic acid group, a sulfonic acid group or a phosphonic acid group, bonded to its particle surface directly or through any other atomic group (—R—) may be used as the self-dispersible pigment. The anionic group may be any of acid type and salt type anionic groups. In the case of the salt type anionic group, the group may be in any of a state in which part of the group dissociates or a state in which the entirety thereof dissociates. In the case of the salt type anionic group, a cation serving as a counterion may be, for example, an alkali metal cation, ammonium or an organic ammonium. Specific examples of the other atomic group (—R—) may include: a linear or branched alkylene group having 1 to 12 carbon atoms; an arylene group, such as a phenylene group or a naphthylene group; a carbonyl group; an imino group; an amide group; a sulfonyl group; an ester group; and an ether group. In addition, groups obtained by combining those groups may be adopted.

(Resin)

A resin may be incorporated into the ink. The content (% by mass) of the resin in the ink is preferably 0.10% by mass or more to 20.00% by mass or less, more preferably 0.50% by mass or more to 15.00% by mass or less with respect to the total mass of the ink.

The resin may be added to the ink (i) for stabilizing the dispersed state of the pigment, that is, as a resin dispersant or an aid therefor. In addition, the resin may be added to the ink (ii) for improving the various characteristics of an image to be recorded. Examples of the form of the resin may include a block copolymer, a random copolymer, a graft copolymer and a combination thereof. In addition, the resin may be a water-soluble resin that can be dissolved in an aqueous medium or may be a resin particle to be dispersed in the aqueous medium. The resin particle does not need to include any coloring material. When the resin is used as a dispersant for dispersing the pigment, any other resin is preferably further incorporated into the ink in addition to the resin serving as a dispersant.

It is preferable that the first ink and the second ink each contain the water-soluble resin. It is more preferable that a content $A_1$ (% by mass) of the water-soluble resin in the first ink and a content $A_2$ (% by mass) of the water-soluble resin in the second ink satisfy the relationship of $A_1 \geq A_2$. When the content $A_1$ of the water-soluble resin in the first ink is equal to or larger than the content $A_2$ of the water-soluble resin in the second ink, evaporation of water in the first ink is easily suppressed, and hence the shift in color tone of the secondary color image is easily suppressed. The resins (water-soluble resins, resin particles) incorporated into the inks may be the same as or different from each other.

The phrase "resin is water-soluble" as used herein means that when the resin is neutralized with an alkali in an equimolar amount to its acid value, the resin is present in an aqueous medium under a state in which the resin does not form any particle whose particle diameter may be measured by a dynamic light scattering method. Whether or not a resin is water-soluble may be determined in accordance with a method described below. First, a liquid (resin solid content: 10% by mass) containing a resin neutralized with an alkali (e.g., sodium hydroxide or potassium hydroxide) equivalent to its acid value is prepared. Next, the prepared liquid is diluted 10-fold (based on a volume) with pure water to prepare a sample solution. Then, when the particle diameter of the resin in the sample solution is measured by a dynamic light scattering method, and a particle having a particle diameter is not measured, the resin may be determined to be water-soluble. Measurement conditions in this case may be set, for example, as described below.

[Measurement Conditions]

SETZERO: 30 seconds

Number of times of measurement: three times

Measurement time: 180 seconds

A particle size analyzer based on a dynamic light scattering method (e.g., product name "UPA-EX150", manufactured by Nikkiso Co., Ltd.) or the like may be used as a particle size distribution-measuring apparatus. The particle size distribution-measuring apparatus to be used, the measurement conditions and the like are of course not limited to the foregoing.

The acid value of the water-soluble resin is preferably 100 mgKOH/g or more to 250 mgKOH/g or less. The acid value of the resin for forming the resin particle is preferably 5 mgKOH/g or more to 100 mgKOH/g or less. As used herein, the acid value of the resin may be a value measured by a potentiometric titrator using a potassium hydroxide-methanol titrant. The weight-average molecular weight of the water-soluble resin is preferably 3,000 or more to 15,000 or less. The weight-average molecular weight of the resin for forming the resin particle is preferably 1,000 or more to 2,000,000 or less. As used herein, the weight average molecular weight of the resin can be measured as a polystyrene equivalent value measured by gel permeation chromatography (GPC). The volume-average particle diameter of the resin particle to be measured by a dynamic light scattering method is preferably 100 nm or more to 500 nm or less.

Examples of the resin may include an acrylic resin, a urethane-based resin and an olefin-based resin. Of those, an acrylic resin and a urethane-based resin are preferable.

Resins each having a hydrophilic unit and a hydrophobic unit as its constituent units are each preferable as the acrylic resin. Of those, a resin having a hydrophilic unit derived from (meth)acrylic acid and a hydrophobic unit derived from at least one of a monomer having an aromatic ring or a (meth)acrylic acid ester-based monomer is preferable. A resin having a hydrophilic unit derived from (meth)acrylic acid and a hydrophobic unit derived from at least one monomer of styrene or α-methylstyrene is particularly preferable. Those resins may each be suitably utilized as a resin dispersant for dispersing the pigment because the resins each easily cause an interaction with the pigment.

The hydrophilic unit is a unit having a hydrophilic group such as an anionic group. The hydrophilic unit may be formed by, for example, polymerizing a hydrophilic monomer having a hydrophilic group. Specific examples of the hydrophilic monomer having a hydrophilic group may include: acidic monomers each having a carboxylic acid group, such as (meth)acrylic acid, itaconic acid, maleic acid and fumaric acid; and anionic monomers, such as anhydrides and salts of those acidic monomers. A cation for forming the salt of the acidic monomer may be, for example, an ion of lithium, sodium, potassium, ammonium or an organic ammonium. The hydrophobic unit is a unit free of a hydrophilic group such as an anionic group. The hydrophobic unit may be formed by, for example, polymerizing a hydrophobic monomer free of a hydrophilic group such as anionic group. Specific examples of the hydrophobic monomer may include: monomers each having an aromatic ring, such as styrene, α-methylstyrene and benzyl (meth)acrylate; and (meth)acrylic acid ester-based monomers, such as methyl (meth)acrylate, butyl (meth)acrylate and 2-ethylhexyl (meth)acrylate.

The urethane-based resin may be obtained by, for example, causing a polyisocyanate and a component reacting therewith (a polyol or a polyamine) to react with each other. In addition, a crosslinking agent or a chain extender may be further caused to react with the reaction product.

The polyisocyanate is a compound having two or more isocyanate groups in a molecular structure thereof. An aliphatic polyisocyanate, an aromatic polyisocyanate or the like may be used as the polyisocyanate. Specific examples of the aliphatic polyisocyanate may include: polyisocyanates each having a chain structure, such as tetramethylene diisocyanate, hexamethylene diisocyanate, dodecamethylene diisocyanate, 2,2,4-trimethylhexamethylene diisocyanate, 2,4,4-trimethylhexamethylene diisocyanate, lysine diisocyanate, 2-methylpentane-1,5-diisocyanate and 3-methylpentane-1,5-diisocyanate; and polyisocyanates each having a cyclic structure, such as isophorone diisocyanate, hydrogenated xylylene diisocyanate, 4,4'-dicyclohexylmethane diisocyanate, 1,4-cyclohexane diisocyanate, methylcyclohexylene diisocyanate and 1,3-bis(isocyanatomethyl) cyclohexane.

Specific examples of the aromatic polyisocyanate may include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, a dialkyldiphenylmethane diisocyanate, a tetraalkyldiphenylmethane diisocyanate and α,α,α',α'-tetramethylxylylene diisocyanate.

A polyol may be used as a component that becomes a unit for forming a urethane resin by a reaction with the above-mentioned polyisocyanate. The "polyol" in the present invention means a compound having two or more hydroxy groups in a molecule thereof. Specific examples thereof may include: a polyol having no acid group, such as polyether polyol, polyester polyol or polycarbonate polyol; and a polyol having an acid group.

Examples of the polyol having no acid group may include long-chain polyols each having a number-average molecular weight of about 450 to about 4,000, such as polyether polyol, polyester polyol and polycarbonate polyol.

Examples of the polyol having an acid group may include polyols each having an acid group, such as a carboxylic acid group, a sulfonic acid group or a phosphonic acid group, in a structure thereof. In particular, it is preferable to use a water-soluble urethane resin synthesized by further using a polyol having an acid group, such as dimethylol propionic acid or dimethylol butanoic acid, in addition to the polyol having no acid group. The acid group may be in the form of a salt. A cation for forming the salt may be, for example, an ion of lithium, sodium, potassium, ammonium or an organic ammonium. When the water-soluble urethane resin has an acid group, the acid group is typically neutralized by a neutralizing agent, such as a hydroxide of an alkali metal (e.g., lithium, sodium or potassium) or ammonia water, and thus the urethane resin exhibits water solubility.

Examples of the polyamine may include: monoamines each having a plurality of hydroxy groups, such as dimethylolethylamine, diethanolmethylamine, dipropanolethylamine and dibutanolmethylamine; difunctional polyamines, such as ethylenediamine, propylenediamine, hexylenediamine, isophoronediamine, xylylenediamine, diphenylmethanediamine, hydrogenated diphenylmethanediamine and hydrazine; and trifunctional or higher polyamines, such as diethylenetriamine, triethylenetetramine, tetraethylenepentamine, a polyamide polyamine and a polyethylene polyimine. A compound having a plurality of hydroxy groups and one "amino group or imino group" was also given as an example of the "polyamine" for convenience.

At the time of the synthesis of the urethane resin, a crosslinking agent or a chain extender may be used. Typically, the crosslinking agent is used at the time of the synthesis of a prepolymer and the chain extender is used when the prepolymer synthesized in advance is subjected to a chain-extending reaction. Basically, a product appropriately selected from, for example, water, a polyisocyanate, a polyol and a polyamine may be used as the crosslinking agent or the chain extender in accordance with purposes, such as crosslinking and chain extension. An extender that can crosslink the urethane resin may be used as the chain extender.

Examples of the olefin-based resin may include α-olefin polymers, such as polyethylene and polypropylene. The α-olefin polymer has an α-olefin unit, such as an ethylene unit or a propylene unit, as a main constituent unit. The α-olefin polymer may be an ethylene homopolymer or a propylene homopolymer, or may be a copolymer of α-olefins, such as ethylene, propylene, 1-butene, 1-pentene, 1-hexene and 4-methyl-1-pentene. Examples of the copolymer may include a random copolymer, a block copolymer, a graft copolymer and a combination of those copolymers.

[Resin Particle]

It is preferable that the first ink and the second ink each contain the resin particle. It is more preferable that a content $B_1$ (% by mass) of the resin particle in the first ink and a content $B_2$ (% by mass) of the resin particle in the second ink satisfy the relationship of $B_1 > B_2$. When the content $B_1$ of the resin particle in the first ink is larger than the content $B_2$ of the resin particle in the second ink, evaporation of water is more easily suppressed in the first ink by virtue of the presence of the resin particle than in the second ink, and hence the shift in color tone of the secondary color image is easily suppressed. Examples of the resin particle may include an acrylic resin particle, an olefin-based resin particle and a urethane-based resin particle.

(Surfactant)

The ink preferably contains a surfactant. The surfactant is oriented to a gas-liquid interface so that its hydrophobic group faces an atmospheric side and its hydrophilic group faces an ink side, and hence the meniscus can be further stabilized. Examples of the surfactant may include an anionic surfactant, a nonionic surfactant, a cationic surfactant and an amphoteric surfactant. Of those, a nonionic surfactant is preferably used from the viewpoint of the reliability of the ink.

Examples of the nonionic surfactant may include: a hydrocarbon-based surfactant, such as an ethylene oxide adduct of acetylene glycol or a polyoxyethylene alkyl ether; a fluorine-based surfactant such as a perfluoroalkyl ethylene oxide adduct; and a silicone-based surfactant such as a polyether-modified siloxane compound. Of those, a hydrocarbon-based surfactant is preferable and an ethylene oxide adduct of acetylene glycol is more preferable.

(Aqueous Medium)

The ink to be used in the ink jet recording method of the present invention is an aqueous ink containing at least water as an aqueous medium. An aqueous medium that is water or a mixed solvent of water and a water-soluble organic solvent may be incorporated into the ink. Deionized water or ion-exchanged water is preferably used as the water. The content (% by mass) of the water in the aqueous ink is preferably 50.00% by mass or more to 95.00% by mass or less with respect to the total mass of the ink. In addition, the content (% by mass) of the water-soluble organic solvent in the aqueous ink is preferably 3.00% by mass or more to 48.00% by mass or less with respect to the total mass of the ink. Solvents that may each be used in an ink for ink jet, such as alcohols, (poly)alkylene glycols, glycol ethers, nitrogen-containing compounds and sulfur-containing compounds, may each be used as the water-soluble organic solvent.

It is preferable that the first ink and the second ink each contain the resin particle and the water-soluble organic solvent. In addition, it is more preferable that a content $C_1$ of the pigment, the content $B_1$ of the resin particle and a content $D_1$ of the water-soluble organic solvent in the first ink and a content $C_2$ of the pigment, the content $B_2$ of the resin particle and a content $D_2$ of the water-soluble organic solvent in the second ink satisfy the relationship represented by the following formula (1). When the following formula (1) is satisfied, evaporation of water in the first ink is easily suppressed, and hence the shift in color tone of the secondary color image is easily suppressed. The units of the above-mentioned contents are each % by mass with respect to the total mass of the ink.

$$(C_1 + B_1)/D_1 > (C_2 + B_2)/D_2 \qquad (1)$$

(Other Additives)

The ink may contain, in addition to the above-mentioned components, various additives, such as a defoaming agent, another surfactant, a pH adjustor, a viscosity adjustor, a rust inhibitor, an antiseptic agent, a fungicide, an antioxidant and a reduction inhibitor, as required.

(Viscosity)

The viscosity of the ink is preferably 3.0 mPa·s or more, and is more preferably 10.0 mPa·s or less. When the viscosity of the ink is set to 3.0 mPa·s or more, a stable meniscus can be formed. The viscosity of the ink may be measured, for example, with a rotary viscometer.

In the inks to be used in the ink jet recording method and ink jet recording apparatus of the present invention, a viscosity $\eta_1$ of the first ink and a viscosity $\eta_2$ of the second ink preferably satisfy the relationship of $\eta_1 \geq \eta_2$. When the viscosity $\eta_1$ of the first ink is equal to or higher than the viscosity $\eta_2$ of the second ink, evaporation of water in the first ink is easily suppressed, and hence the shift in color tone of the secondary color image is easily suppressed.

(Lightness)

In the inks to be used in the ink jet recording method and ink jet recording apparatus of the present invention, the lightness of the first ink is preferably higher than the lightness of the second ink. When the lightness of the first ink is higher than the lightness of the second ink, a change in color caused when water in the first ink evaporates is easily suppressed, and hence the shift in color tone of the secondary color image is easily suppressed.

The relationship between the lightnesses of the inks may be calculated by measuring the lightness of each of the inks, which has been diluted with water by an appropriate factor so as to achieve an absorbance value suitable for measurement, with a spectrophotometer, but the relationship between the lightnesses of the inks may be changed depending on the content of the coloring material in each of the inks. When the lightnesses of inks are compared to each other, it is required that the inks be diluted with water by the same factor.

The first ink and the second ink may have different hues or the same hue, and any combination of hues may be used. In particular, it is preferable that the first ink and the second ink have different hues. When the hues are different, the high-low order of the lightnesses of basic colors for aqueous inks to be used in the ink jet recording method is typically the order of black, cyan, magenta and yellow sequentially from the smallest to the largest.

EXAMPLES

The present invention is described in more detail below by way of Examples and Comparative Examples. The present invention is by no means limited to Examples below within a range not departing from the gist of the present invention. "Part(s)" and "%" with regard to the description of the amounts of components are by mass unless otherwise stated.

<Preparation of Pigment Dispersion Liquid>

(Pigment Dispersion Liquid 1)

1.6 Grams of 4-amino-1,2-benzenedicarboxylic acid was added to a solution obtained by dissolving 5.0 g of concentrated hydrochloric acid in 5.5 g of water at a temperature of 5° C. In order to maintain the temperature at 10° C. or less, a solution obtained by dissolving 1.8 g of sodium nitrite in 9.0 g of water was added to the solution obtained above under stirring in an ice bath. After the mixed solution was stirred for 15 minutes, 6.0 g of carbon black having a specific surface area of 220 m²/g and a DBP oil absorption of 105 mL/100 g was added to be mixed with the resultant. Further, after the mixture was stirred for 15 minutes, the resultant slurry was filtered through a paper filter (standard paper filter No. 2, manufactured by Advantec), and the carbon black was thoroughly washed with water, followed by drying in an oven at a temperature of 110° C. Water was added to the resultant carbon black to provide a pigment dispersion liquid in a state in which a self-dispersible pigment having a —C₆H₃—(COONa)₂ group bonded to the particle surface of the carbon black was dispersed in water. After that, a sodium ion in the pigment dispersion liquid was substituted with a potassium ion by an ion exchange method. Thus, a pigment dispersion liquid 1 having a pigment content of 16.0% was prepared.

(Pigment Dispersion Liquid 2)

A styrene-ethyl acrylate-acrylic acid copolymer (resin) having an acid value of 150 mgKOH/g and a weight-average molecular weight of 8,000 was prepared. 20.0 Parts of the resin was neutralized with potassium hydroxide in an equimolar amount to its acid value, and an appropriate amount of pure water was added thereto. Thus, a resin aqueous solution 1 having a resin content (solid content) of 20.0% was prepared. 10.0 Parts of a pigment (C.I. Pigment Blue 15:3), 15.0 parts of the resin aqueous solution 1 and 75.0 parts of pure water were mixed to provide a mixture. The resultant mixture and 200 parts of zirconia beads each having a diameter of 0.3 mm were loaded into a batch-type vertical sand mill (manufactured by Aimex Co., Ltd.), and the mixture was dispersed for 5 hours while being cooled with water. After that, the resultant was centrifuged so that a coarse particle was removed. The residue was filtered with a cellulose acetate filter having a pore size of 3.0 μm (manufactured by Advantec) under pressure. Thus, a pigment dispersion liquid 2 having a pigment content of 16.0% and a resin dispersant (resin) content of 3.2% was prepared.

(Pigment Dispersion Liquid 3)

A pigment dispersion liquid 3 having a pigment content of 16.0% and a resin dispersant (resin) content of 3.2% was obtained by the same procedure as that in the case of the above-mentioned pigment dispersion liquid 2 except that the kind of the pigment was changed to C.I. Pigment Red 122.

(Pigment Dispersion Liquid 4)

A pigment dispersion liquid 4 having a pigment content of 16.0% and a resin dispersant (resin) content of 3.2% was obtained by the same procedure as that in the case of the above-mentioned pigment dispersion liquid 2 except that the kind of the pigment was changed to C.I. Pigment Yellow 74.

(Pigment Dispersion Liquid 5)

A pigment dispersion liquid 5 having a pigment content of 16.0% and a resin dispersant (resin) content of 3.2% was obtained by the same procedure as that of the above-mentioned pigment dispersion liquid 2 except that the kind of the pigment was changed to carbon black (specific surface area: 220 m²/g, DBP oil absorption: 105 mL/100 g).

(Pigment Dispersion Liquid 6)

A pigment dispersion liquid 6 having a pigment content of 16.0% was prepared by concentrating a commercially available pigment dispersion liquid (product name "CAB-O-JET 250C", manufactured by Cabot Corporation). A pigment in the pigment dispersion liquid 6 is a self-dispersible pigment in which a sulfonic acid group is bonded to the particle surface of a pigment (C.I. Pigment Blue 15:4) via a benzene ring.

<Preparation of Liquid Containing Resin>

(Aqueous Solution of Acrylic Resin)

A styrene-acrylic acid copolymer (resin) having an acid value of 120 mgKOH/g and a weight-average molecular weight of 8,000 was neutralized with a sodium hydroxide aqueous solution. Thus, an aqueous solution of an acrylic resin having a resin content (solid content) of 32.0% was obtained.

(Aqueous Solution of Urethane Resin)

29 Parts of isophorone diisocyanate, 39 parts of polypropylene glycol having a number-average molecular weight of 2,000, 12 parts of dimethylol propionic acid, 0.02 part of dibutyltin dilaurate and 120 parts of methyl ethyl ketone were loaded into a four-necked flask including a temperature gauge, a stirring machine, a nitrogen-introducing tube and a reflux tube, and were caused to react with each other under a nitrogen gas atmosphere at 80° C. for 6 hours. After that, an appropriate amount of methanol was added thereto, and the contents were caused to react with each other at 80° C. until a predetermined weight-average molecular weight was achieved. After the reaction, the resultant was cooled to 40° C., and ion-exchanged water was added thereto. While the mixture was stirred with a homomixer at a high speed, a potassium hydroxide aqueous solution was added thereto. Methyl ethyl ketone was evaporated from the resultant resin solution by heating under reduced pressure. Thus, an aqueous solution of a urethane resin having a resin content (solid content) of 32.0% was prepared.

(Aqueous Dispersion Liquid of Resin Particle)

18.0 Parts of butyl methacrylate, 0.35 part of methacrylic acid, 2.0 parts of a polymerization initiator (2,2'-azobis(2-methylbutyronitrile)) and 2.0 parts of n-hexadecane were loaded into a four-necked flask including a stirring machine, a reflux condenser and a nitrogen gas-introducing tube. A nitrogen gas was introduced into a reaction system, and the contents were stirred for 0.5 hour. 78.0 Parts of a 6.0% aqueous solution of an emulsifier (product name "NIKKOL BC15", manufactured by Nikko Chemicals Co., Ltd.) was dropped into the reaction system, and the contents were stirred for 0.5 hour to provide a mixture. The mixture was emulsified through ultrasonic irradiation with an ultrasonic irradiator for 3 hours, and was then subjected to a polymerization reaction at 80° C. for 4 hours under a nitrogen atmosphere. The reaction system was cooled to 25° C., followed by filtration and addition of an appropriate amount of pure water. Thus, an aqueous dispersion liquid of a resin particle having a resin particle content of 20.0% was obtained.

<Preparation of Ink>

Inks were each prepared by mixing and sufficiently stirring the components (unit: %) shown in the upper sections of Table 1 (Table 1-1 to Table 1-6), followed by filtration with a cellulose acetate filter having a pore size of 3.0 μm (manufactured by Advantec) under pressure. Values on polyethylene glycol indicate a number-average molecular weight. The term "ACETYLENOL E60" represents the product name of a surfactant manufactured by Kawaken Fine Chemicals Co., Ltd. The molar fraction (%) of water in each of the inks, the content C (%) of the pigment, the content A (%) of the water-soluble resin, the content B (%) of the resin particle and the content D (%) of the water-soluble organic solvent in each of the inks, the value of (C+B)/D and the viscosity (mPa·s) of each of the inks are shown in the lower sections of Table 1. The characteristics of the inks are shown. The viscosity of each of the inks was measured under the conditions of a temperature of 25° C. and 50 rpm with an E-type viscometer (product name "RE-85L", manufactured by Toki Sangyo Co., Ltd.).

TABLE 1

| Composition and characteristics of ink | | | | | | |
|---|---|---|---|---|---|---|
| | Cyan ink | | | | | |
| | C1 | C2 | C3 | C4 | C5 | C6 |
| Pigment dispersion liquid 1 | | | | | | |
| Pigment dispersion liquid 2 | 50.00 | 30.00 | | 50.00 | 45.00 | 50.00 |
| Pigment dispersion liquid 3 | | | | | | |
| Pigment dispersion liquid 4 | | | | | | |
| Pigment dispersion liquid 5 | | | | | | |
| Pigment dispersion liquid 6 | | | 50.00 | | | |
| C.I. Food Black 2 | | | | | | |
| C.I. Direct Blue 199 | | | | | | |
| Liquid containing acrylic resin | 1.25 | 1.25 | 6.25 | | 1.75 | 1.25 |
| Liquid containing urethane resin | | | | 1.25 | | |
| Liquid containing resin particle | 20.00 | 17.50 | 20.00 | 20.00 | 20.00 | 20.00 |
| Glycerin | 8.00 | 5.00 | 8.00 | 8.00 | 8.00 | 15.00 |
| Polyethylene glycol 600 | | | | | 1.00 | |
| Polyethylene glycol 200 | | | | | | |
| Triethylene glycol | 8.00 | 8.00 | 8.00 | 8.00 | 8.00 | 12.00 |
| 1,2-Hexanediol | 1.00 | 1.00 | 1.00 | 1.00 | 1.00 | 1.00 |
| Ethylene glycol | | | | | | |
| Urea | | | | | | |
| 2-Pyrrolidone | | | | | | |
| Ethylene urea | | | | | | |
| 1,5-Pentanediol | | | | | | |
| ACETYLENOL E60 | 0.50 | 0.50 | 0.50 | 0.50 | 0.50 | 0.50 |
| Ion-exchanged water | 11.25 | 36.75 | 6.25 | 11.25 | 14.75 | 0.25 |
| Molar fraction R (%) of water | 96.2 | 97.3 | 96.2 | 96.2 | 96.1 | 92.7 |
| Content C (%) of pigment | 8.00 | 4.80 | 8.00 | 8.00 | 7.20 | 8.00 |
| Content A (%) of water-soluble resin | 2.00 | 1.36 | 2.00 | 2.00 | 2.00 | 2.00 |
| Content B (%) of resin particle | 4.00 | 3.50 | 4.00 | 4.00 | 4.00 | 4.00 |
| Content D (%) of water-soluble organic solvent | 17.00 | 14.00 | 17.00 | 17.00 | 18.00 | 28.00 |
| Value of (C + B)/D | 0.71 | 0.59 | 0.71 | 0.71 | 0.62 | 0.43 |
| Viscosity n (mPa · s) | 6.0 | 3.0 | 6.0 | 6.0 | 5.0 | 8.0 |

| | Cyan ink | | | | | |
|---|---|---|---|---|---|---|
| | C7 | C8 | C9 | C10 | C11 | C12 |
| Pigment dispersion liquid 1 | | | | | | |
| Pigment dispersion liquid 2 | 50.00 | 50.00 | 50.00 | 50.00 | 50.00 | |
| Pigment dispersion liquid 3 | | | | | | |
| Pigment dispersion liquid 4 | | | | | | |
| Pigment dispersion liquid 5 | | | | | | |
| Pigment dispersion liquid 6 | | | | | | |
| C.I. Food Black 2 | | | | | | |
| C.I. Direct Blue 199 | | | | | | 1.20 |
| Liquid containing acrylic resin | 1.25 | 1.25 | | 1.25 | 1.25 | |
| Liquid containing urethane resin | | | | | | |
| Liquid containing resin particle | 20.00 | 5.00 | 20.00 | 20.00 | 20.00 | |
| Glycerin | 15.50 | 5.00 | 8.00 | 9.00 | 5.00 | 10.00 |
| Polyethylene glycol 600 | | | | | | |
| Polyethylene glycol 200 | | | | | | |
| Triethylene glycol | 11.50 | 8.00 | 8.00 | 11.00 | 5.00 | |
| 1,2-Hexanediol | 1.00 | 1.00 | 1.00 | 1.00 | 1.00 | |
| Ethylene glycol | | | | | | 8.00 |
| Urea | | | | | | |
| 2-Pyrrolidone | | | | | | 7.00 |
| Ethylene urea | | | | | | 2.00 |
| 1,5-Pentanediol | | | | | | 3.00 |
| ACETYLENOL E60 | 0.50 | 0.50 | 0.50 | 0.50 | 0.50 | 1.00 |
| Ion-exchanged water | 0.25 | 29.25 | 12.50 | 7.25 | 17.25 | 67.80 |

TABLE 1-continued

| Composition and characteristics of ink | | | | | | |
|---|---|---|---|---|---|---|
| Molar fraction R (%) of water | 92.6 | 97.1 | 96.1 | 95.2 | 97.6 | 90.9 |
| Content C (%) of pigment | 8.00 | 8.00 | 8.00 | 8.00 | 8.00 | 0.00 |
| Content A (%) of water-soluble resin | 2.00 | 2.00 | 1.60 | 2.00 | 2.00 | 0.00 |
| Content B (%) of resin particle | 4.00 | 1.00 | 4.00 | 4.00 | 4.00 | 0.00 |
| Content D (%) of water-soluble organic solvent | 28.00 | 14.00 | 17.00 | 21.00 | 11.00 | 30.00 |
| Value of (C + B)/D | 0.43 | 0.64 | 0.71 | 0.57 | 1.09 | 0.00 |
| Viscosity n (mPa · s) | 8.0 | 3.5 | 5.9 | 7.0 | 5.5 | 2.4 |

| | Magenta ink | | Yellow ink | Black ink | | |
|---|---|---|---|---|---|---|
| | M1 | M2 | Y1 | K1 | K2 | K3 |
| Pigment dispersion liquid 1 | | | | 50.00 | | 30.00 |
| Pigment dispersion liquid 2 | | | | | | |
| Pigment dispersion liquid 3 | 50.00 | 30.00 | | | | |
| Pigment dispersion liquid 4 | | | 50.00 | | | |
| Pigment dispersion liquid 5 | | | | | 30.00 | |
| Pigment dispersion liquid 6 | | | | | | |
| C.I. Food Black 2 | | | | | | |
| C.I. Direct Blue 199 | | | | | | |
| Liquid containing acrylic resin | 1.25 | 1.25 | 1.25 | 6.25 | 1.25 | 6.25 |
| Liquid containing urethane resin | | | | | | |
| Liquid containing resin particle | 20.00 | 17.50 | 20.00 | 5.00 | 17.50 | 17.50 |
| Glycerin | 8.00 | 5.00 | 8.00 | 5.00 | 5.00 | 5.00 |
| Polyethylene glycol 600 | | | | | | |
| Polyethylene glycol 200 | | | | | | |
| Triethylene glycol | 8.00 | 8.00 | 8.00 | 8.00 | 8.00 | 8.00 |
| 1,2-Hexanediol | 1.00 | 1.00 | 1.00 | 1.00 | 1.00 | 1.00 |
| Ethylene glycol | | | | | | |
| Urea | | | | | | |
| 2-Pyrrolidone | | | | | | |
| Ethylene urea | | | | | | |
| 1,5-Pentanediol | | | | | | |
| ACETYLENOL E60 | 0.50 | 0.50 | 0.50 | 0.50 | 0.50 | 0.50 |
| Ion-exchanged water | 11.25 | 36.75 | 11.25 | 24.25 | 36.75 | 31.75 |
| Molar fraction R (%) of water | 96.2 | 97.3 | 96.2 | 97.1 | 97.3 | 97.2 |
| Content C (%) of pigment | 8.00 | 4.80 | 8.00 | 8.00 | 4.80 | 4.80 |
| Content A (%) of water-soluble resin | 2.00 | 1.36 | 2.00 | 2.00 | 1.36 | 2.00 |
| Content B (%) of resin particle | 4.00 | 3.50 | 4.00 | 1.00 | 3.50 | 3.50 |
| Content D (%) of water-soluble organic solvent | 17.00 | 14.00 | 17.00 | 14.00 | 14.00 | 14.00 |
| Value of (C + B)/D | 0.71 | 0.59 | 0.71 | 0.64 | 0.59 | 0.59 |
| Viscosity n (mPa · s) | 6.0 | 3.0 | 6.0 | 4.0 | 3.0 | 3.0 |

| | Black ink | | | | | |
|---|---|---|---|---|---|---|
| | K4 | K5 | K6 | K7 | K8 | K9 |
| Pigment dispersion liquid 1 | 30.00 | 50.00 | 30.00 | 30.00 | 50.00 | 62.50 |
| Pigment dispersion liquid 2 | | | | | | |
| Pigment dispersion liquid 3 | | | | | | |
| Pigment dispersion liquid 4 | | | | | | |
| Pigment dispersion liquid 5 | | | | | | |
| Pigment dispersion liquid 6 | | | | | | |
| C.I. Food Black 2 | | | | | | |
| C.I. Direct Blue 199 | | | | | | |
| Liquid containing acrylic resin | 6.25 | 6.25 | 5.50 | 5.50 | 6.25 | 4.50 |
| Liquid containing urethane resin | | | | | | |
| Liquid containing resin particle | 17.50 | 15.00 | 3.00 | 3.00 | 20.00 | 5.00 |
| Glycerin | 10.00 | 5.00 | 5.00 | 3.50 | 8.00 | 5.00 |
| Polyethylene glycol 600 | | | | | | |
| Polyethylene glycol 200 | 5.00 | | | | | |
| Triethylene glycol | 2.00 | 10.00 | 7.50 | 9.00 | 8.00 | 10.00 |
| 1,2-Hexanediol | 1.00 | 1.00 | 1.00 | 1.00 | 1.00 | 1.00 |
| Ethylene glycol | | | | | | |
| Urea | | | | | | |
| 2-Pyrrolidone | | | | | | |
| Ethylene urea | | | | | | |
| 1,5-Pentanediol | | | | | | |
| ACETYLENOL E60 | 0.50 | 0.50 | 0.50 | 0.50 | 0.50 | 0.50 |
| Ion-exchanged water | 27.75 | 12.25 | 47.50 | 47.50 | 6.25 | 11.50 |
| Molar fraction R (%) of water | 96.2 | 96.7 | 97.6 | 97.7 | 96.2 | 96.7 |
| Content C (%) of pigment | 4.80 | 8.00 | 4.80 | 4.80 | 8.00 | 10.00 |
| Content A (%) of water-soluble resin | 2.00 | 2.00 | 1.76 | 1.76 | 2.00 | 1.44 |

TABLE 1-continued

| Composition and characteristics of ink | | | | | | |
|---|---|---|---|---|---|---|
| Content B (%) of resin particle | 3.50 | 3.00 | 0.60 | 0.60 | 4.00 | 1.00 |
| Content D (%) of water-soluble organic solvent | 18.00 | 16.00 | 13.50 | 13.50 | 17.00 | 16.00 |
| Value of (C + B)/D | 0.46 | 0.69 | 0.40 | 0.40 | 0.71 | 0.69 |
| Viscosity n (mPa · s) | 3.7 | 5.5 | 3.0 | 3.0 | 6.0 | 6.0 |

| | Black ink | | | | | |
|---|---|---|---|---|---|---|
| | K10 | K11 | K12 | K13 | K14 | K15 |
| Pigment dispersion liquid 1 | 62.50 | 50.00 | 50.00 | 40.00 | 40.00 | 50.00 |
| Pigment dispersion liquid 2 | | | | | | |
| Pigment dispersion liquid 3 | | | | | | |
| Pigment dispersion liquid 4 | | | | | | |
| Pigment dispersion liquid 5 | | | | | | |
| Pigment dispersion liquid 6 | | | | | | |
| C.I. Food Black 2 | | | | | | |
| C.I. Direct Blue 199 | | | | | | |
| Liquid containing acrylic resin | 6.00 | 3.12 | 9.38 | | | 5.75 |
| Liquid containing urethane resin | | | | | | |
| Liquid containing resin particle | 5.00 | 5.00 | 5.00 | 20.00 | 22.50 | 15.50 |
| Glycerin | 4.00 | 5.00 | 5.00 | 4.00 | 4.00 | 5.00 |
| Polyethylene glycol 600 | | | | | | |
| Polyethylene glycol 200 | | | | | | 9.70 |
| Triethylene glycol | 11.00 | 8.00 | 8.00 | 12.00 | 12.00 | |
| 1,2-Hexanediol | 1.00 | 1.00 | 1.00 | 1.00 | 1.00 | 1.00 |
| Ethylene glycol | | | | | | |
| Urea | | | | | | |
| 2-Pyrrolidone | | | | | | |
| Ethylene urea | | | | | | |
| 1,5-Pentanediol | | | | | | |
| ACETYLENOL E60 | 0.50 | 0.50 | 0.50 | 0.50 | 0.50 | 0.50 |
| Ion-exchanged water | 10.00 | 27.38 | 21.13 | 22.50 | 20.00 | 12.55 |
| Molar fraction R (%) of water | 97.0 | 97.3 | 97.2 | 96.8 | 96.7 | 97.2 |
| Content C (%) of pigment | 10.00 | 8.00 | 8.00 | 6.40 | 6.40 | 8.00 |
| Content A (%) of water-soluble resin | 1.92 | 1.00 | 3.00 | 0.00 | 0.00 | 1.84 |
| Content B (%) of resin particle | 1.00 | 1.00 | 1.00 | 4.00 | 4.50 | 3.10 |
| Content D (%) of water-soluble organic solvent | 16.00 | 14.00 | 14.00 | 17.00 | 17.00 | 15.70 |
| Value of (C + B)/D | 0.69 | 0.64 | 0.64 | 0.61 | 0.64 | 0.71 |
| Viscosity n (mPa · s) | 6.2 | 3.7 | 4.3 | 4.5 | 4.8 | 5.5 |

| | Black ink | | |
|---|---|---|---|
| | K16 | K17 | K18 |
| Pigment dispersion liquid 1 | 50.00 | 50.00 | |
| Pigment dispersion liquid 2 | | | |
| Pigment dispersion liquid 3 | | | |
| Pigment dispersion liquid 4 | | | |
| Pigment dispersion liquid 5 | | | |
| Pigment dispersion liquid 6 | | | |
| C.I. Food Black 2 | | | 1.00 |
| C.I. Direct Blue 199 | | | |
| Liquid containing acrylic resin | 6.25 | 6.25 | |
| Liquid containing urethane resin | | | |
| Liquid containing resin particle | 17.50 | 17.50 | |
| Glycerin | 5.00 | 10.00 | 10.00 |
| Polyethylene glycol 600 | | | |
| Polyethylene glycol 200 | 8.00 | | |
| Triethylene glycol | | 10.00 | |
| 1,2-Hexanediol | 1.00 | 1.00 | |
| Ethylene glycol | | | 8.00 |
| Urea | | | 10.00 |
| 2-Pyrrolidone | | | 5.00 |
| Ethylene urea | | | |
| 1,5-Pentanediol | | | |
| ACETYLENOL E60 | 0.50 | 0.50 | 1.00 |
| Ion-exchanged water | 11.75 | 4.75 | 65.00 |
| Molar fraction R (%) of water | 97.6 | 95.2 | 88.6 |
| Content C (%) of pigment | 8.00 | 8.00 | 0.00 |
| Content A (%) of water-soluble resin | 2.00 | 2.00 | 0.00 |
| Content B (%) of resin particle | 3.50 | 3.50 | 0.00 |
| Content D (%) of water-soluble organic solvent | 14.00 | 21.00 | 33.00 |
| Value of (C + B)/D | 0.82 | 0.55 | 0.00 |
| Viscosity n (mPa · s) | 5.2 | 7.0 | 2.4 |

EVALUATION

An ink jet recording apparatus including a main portion illustrated in each of FIG. 2, FIG. 3A and FIG. 3B was used, the ink was loaded into an ink cartridge illustrated in each of FIG. 3A and FIG. 3B, and the following evaluations were performed under an environment at a temperature of 25° C. and a relative humidity of 50%. A recording head of a serial type having the configuration illustrated in FIG. 4 (circulation serial head) was used as a recording head. The recording head includes, per ejection orifice, a first flow path and a second flow path communicating to each other between the ejection orifice and an ejection element, and is configured to flow the ink in the first flow path into the second flow path through utilization of a pump. The number of ejection orifices per ejection orifice array is 256, an ejection orifice density is 600 dpi and an ink ejection amount per ejection orifice is 8 ng. A solid image to be recorded in each of the following evaluations was recorded by using two ejection orifice arrays under such a condition that one ink droplet was applied from each of the ejection orifice arrays to a region measuring 1/600 inch by 1/600 inch. An image was recorded under the conditions shown in Table 2 (Table 2-1 to Table 2-4) for inks (ink set of a first ink and a second ink) and ejection orifice arrays (reference numerals in FIG. 4) having been used. In addition, the image was recorded under the conditions shown in Table 2 for the presence or absence of a flow step (circulation flow) in the recording head, the flow speed of the ink, a scanning type, a scanning speed, a distance between the ejection orifice arrays and the presence or absence of warming of the ink in the recording head. The warming of the ink in the recording head was performed so that the temperature of the ink reached 60° C. In addition, a preliminary ejection operation of the recording head outside the region of a recording medium was not performed. Further, the recording medium to which the ink had been applied was not subjected to a heating step. The magnitude relationship between the molar fraction $R_1$ of water in the first ink and the molar fraction $R_2$ of water in the second ink and the value (%) of $R_2-R_1$ are shown in Table 2. In addition, the magnitude relationships between the viscosities $\eta_1$ and $\eta_2$ of the inks, between the contents $A_1$ and $A_2$ of the water-soluble resin therein and between the contents $B_1$ and $B_2$ of the resin particle therein are shown in Table 2.

(Shift in Color Tone of Secondary Color Image)

Figure 10:
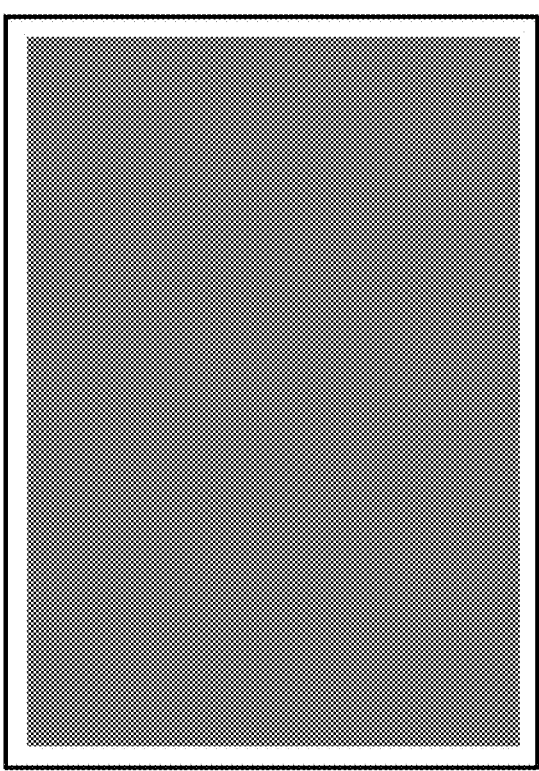
FIG. 10 is a schematic view for illustrating a pattern of an image recorded in Examples.

An image was recorded with the first ink and the second ink by single pass by using the above-mentioned ink jet recording apparatus and reciprocally scanning the recording head. Specifically, 100 secondary color solid images (see FIG. 10) were recorded by single pass so that the recording duties of the respective inks were 50% and the total recording duty was 100%. A medium available under the product name "High-quality exclusive paper HR-101SA4" (manufactured by Canon Inc.) was used as a recording medium. The solid images recorded on the 1st sheet and the 100th sheet were each measured for color with a fluorescent spectrodensitometer (product name "FD-7", manufactured by Konica Minolta, Inc.) under the conditions of a light source of D50 and a field of view of 2°, and a color difference ΔE between the solid images on the 1st sheet and the 100th sheet was calculated. The color difference ΔE is calculated from the equation: color difference $\Delta E=\{(L_1{}^*-L_2{}^*)^2+(a_1{}^*-a_2{}^*)^2+(b_1{}^*-b_2{}^*)^2\}$ based on L\*, a\* and b\* in an L\*a\*b\* color system specified by the International Commission on Illumination (CIE). The values in the image on the 1st sheet were defined as "$L_1{}^*$", "$a_1{}^*$" and "$b_1{}^*$", and the values in the image on the 100th sheet were defined as "$L_2{}^*$", "$a_2{}^*$" and "$b_2{}^*$". A shift in color tone of the secondary color image at the beginning of recording and after long-time recording was evaluated from the resultant color difference ΔE in accordance with the following evaluation criteria. In the present invention, in the following evaluation criteria, while levels "A" and "B" were defined as acceptable levels, a level "C" was defined as an unacceptable level. The results are shown in Table 2.

A: The color difference ΔE was less than 1.0.

B: The color difference ΔE was 1.0 or more to less than 1.5.

C: The color difference ΔE was 1.5 or more.

TABLE 2

| | | First ink | | Second ink | | | |
|---|---|---|---|---|---|---|---|
| | | Kind of ink | Ejection orifice array | Kind of ink | Ejection orifice array | Relationship between $R_1$ and $R_2$ | Value (%) of $R_2 - R_1$ |
| Example | 1 | C1 | 24 | K1 | 23 | $R_1 < R_2$ | 0.9 |
| | 2 | M1 | 24 | K1 | 23 | $R_1 < R_2$ | 0.9 |
| | 3 | Y1 | 24 | K1 | 23 | $R_1 < R_2$ | 0.9 |
| | 4 | M1 | 24 | C2 | 23 | $R_1 < R_2$ | 1.1 |
| | 5 | Y1 | 24 | C2 | 23 | $R_1 < R_2$ | 1.1 |
| | 6 | Y1 | 24 | M2 | 23 | $R_1 < R_2$ | 1.1 |
| | 7 | C1 | 24 | K2 | 23 | $R_1 < R_2$ | 1.1 |
| | 8 | C3 | 24 | K1 | 23 | $R_1 < R_2$ | 0.9 |
| | 9 | C4 | 24 | K3 | 23 | $R_1 < R_2$ | 1.0 |
| | 10 | C5 | 24 | K4 | 23 | $R_1 < R_2$ | 0.1 |
| | 11 | C1 | 24 | K5 | 23 | $R_1 < R_2$ | 0.5 |
| | 12 | C6 | 24 | K6 | 23 | $R_1 < R_2$ | 4.9 |
| | 13 | C7 | 24 | K7 | 23 | $R_1 < R_2$ | 5.1 |
| | 14 | K8 | 24 | C8 | 23 | $R_1 < R_2$ | 0.9 |
| | 15 | C1 | 24 | K9 | 23 | $R_1 < R_2$ | 0.5 |
| | 16 | C1 | 24 | K10 | 23 | $R_1 < R_2$ | 0.8 |
| | 17 | C1 | 24 | K11 | 23 | $R_1 < R_2$ | 1.1 |
| | 18 | C1 | 24 | K12 | 23 | $R_1 < R_2$ | 1.0 |
| | 19 | C9 | 24 | K13 | 23 | $R_1 < R_2$ | 0.7 |
| | 20 | C9 | 24 | K14 | 23 | $R_1 < R_2$ | 0.6 |
| | 21 | C1 | 24 | K15 | 23 | $R_1 < R_2$ | 1.0 |
| | 22 | C1 | 24 | K16 | 23 | $R_1 < R_2$ | 1.4 |

TABLE 2-continued

| | | | | | | | |
|---|---|---|---|---|---|---|---|
| | 23 | C1 | 24 | K1 | 23 | $R_1 < R_2$ | 0.9 |
| | 24 | C1 | 24 | K1 | 23 | $R_1 < R_2$ | 0.9 |
| | 25 | C1 | 24 | K1 | 23 | $R_1 < R_2$ | 0.9 |
| | 26 | C1 | 24 | K1 | 23 | $R_1 < R_2$ | 0.9 |
| | 27 | C1 | 24 | K1 | 23 | $R_1 < R_2$ | 0.9 |
| | 28 | C1 | 24 | K1 | 23 | $R_1 < R_2$ | 0.9 |
| | 29 | C1 | 24 | K1 | 23 | $R_1 < R_2$ | 0.9 |
| | 30 | C1 | 24 | K1 | 22 | $R_1 < R_2$ | 0.9 |
| | 31 | C1 | 24 | K1 | 21 | $R_1 < R_2$ | 0.9 |
| Comparative | 1 | C10 | 24 | K17 | 23 | $R_1 = R_2$ | 0.0 |
| Example | 2 | C11 | 24 | K17 | 23 | $R_1 > R_2$ | −2.4 |
| | 3 | C10 | 24 | K17 | 23 | $R_1 = R_2$ | 0.0 |
| | 4 | C11 | 24 | K17 | 23 | $R_1 > R_2$ | −2.4 |
| | 5 | C1 | 24 | K1 | 23 | $R_1 < R_2$ | 0.9 |
| Reference | 1 | C1 | — | K1 | — | $R_1 < R_2$ | 0.9 |
| Example | 2 | C12 | 24 | K18 | 23 | $R_1 > R_2$ | −2.3 |
| | 3 | K18 | 24 | C12 | 23 | $R_1 < R_2$ | 2.3 |

| | | Relationship between $\eta_1$ and $\eta_2$ | Relationship between $A_1$ and $A_2$ | Relationship between $B_1$ and $B_2$ | Relationship between $(C_1 + B_1)/D_1$ and $(C_2 + B_2)/D_2$ |
|---|---|---|---|---|---|
| Example | 1 | $\eta_1 > \eta_2$ | $A_1 = A_2$ | $B_1 > B_2$ | First ink > second ink |
| | 2 | $\eta_1 > \eta_2$ | $A_1 = A_2$ | $B_1 > B_2$ | First ink > second ink |
| | 3 | $\eta_1 > \eta_2$ | $A_1 = A_2$ | $B_1 > B_2$ | First ink > second ink |
| | 4 | $\eta_1 > \eta_2$ | $A_1 > A_2$ | $B_1 > B_2$ | First ink > second ink |
| | 5 | $\eta_1 > \eta_2$ | $A_1 > A_2$ | $B_1 > B_2$ | First ink > second ink |
| | 6 | $\eta_1 > \eta_2$ | $A_1 > A_2$ | $B_1 > B_2$ | First ink > second ink |
| | 7 | $\eta_1 > \eta_2$ | $A_1 > A_2$ | $B_1 > B_2$ | First ink > second ink |
| | 8 | $\eta_1 > \eta_2$ | $A_1 = A_2$ | $B_1 > B_2$ | First ink > second ink |
| | 9 | $\eta_1 > \eta_2$ | $A_1 = A_2$ | $B_1 > B_2$ | First ink > second ink |
| | 10 | $\eta_1 > \eta_2$ | $A_1 = A_2$ | $B_1 > B_2$ | First ink > second ink |
| | 11 | $\eta_1 > \eta_2$ | $A_1 = A_2$ | $B_1 > B_2$ | First ink > second ink |
| | 12 | $\eta_1 > \eta_2$ | $A_1 > A_2$ | $B_1 > B_2$ | First ink > second ink |
| | 13 | $\eta_1 > \eta_2$ | $A_1 > A_2$ | $B_1 > B_2$ | First ink > second ink |
| | 14 | $\eta_1 > \eta_2$ | $A_1 = A_2$ | $B_1 > B_2$ | First ink > second ink |
| | 15 | $\eta_1 = \eta_2$ | $A_1 > A_2$ | $B_1 > B_2$ | First ink > second ink |
| | 16 | $\eta_1 < \eta_2$ | $A_1 > A_2$ | $B_1 > B_2$ | First ink > second ink |
| | 17 | $\eta_1 > \eta_2$ | $A_1 > A_2$ | $B_1 > B_2$ | First ink > second ink |
| | 18 | $\eta_1 > \eta_2$ | $A_1 < A_2$ | $B_1 > B_2$ | First ink > second ink |
| | 19 | $\eta_1 > \eta_2$ | $A_1 > A_2$ | $B_1 = B_2$ | First ink > second ink |
| | 20 | $\eta_1 > \eta_2$ | $A_1 > A_2$ | $B_1 < B_2$ | First ink > second ink |
| | 21 | $\eta_1 > \eta_2$ | $A_1 > A_2$ | $B_1 > B_2$ | First ink = second ink |
| | 22 | $\eta_1 > \eta_2$ | $A_1 = A_2$ | $B_1 > B_2$ | First ink < second ink |
| | 23 | $\eta_1 > \eta_2$ | $A_1 = A_2$ | $B_1 > B_2$ | First ink > second ink |
| | 24 | $\eta_1 > \eta_2$ | $A_1 = A_2$ | $B_1 > B_2$ | First ink > second ink |
| | 25 | $\eta_1 > \eta_2$ | $A_1 = A_2$ | $B_1 > B_2$ | First ink > second ink |
| | 26 | $\eta_1 > \eta_2$ | $A_1 = A_2$ | $B_1 > B_2$ | First ink > second ink |
| | 27 | $\eta_1 > \eta_2$ | $A_1 = A_2$ | $B_1 > B_2$ | First ink > second ink |
| | 28 | $\eta_1 > \eta_2$ | $A_1 = A_2$ | $B_1 > B_2$ | First ink > second ink |
| | 29 | $\eta_1 > \eta_2$ | $A_1 = A_2$ | $B_1 > B_2$ | First ink > second ink |
| | 30 | $\eta_1 > \eta_2$ | $A_1 = A_2$ | $B_1 > B_2$ | First ink > second ink |
| | 31 | $\eta_1 > \eta_2$ | $A_1 = A_2$ | $B_1 > B_2$ | First ink > second ink |
| Comparative | 1 | $\eta_1 = \eta_2$ | $A_1 = A_2$ | $B_1 > B_2$ | First ink > second ink |
| Example | 2 | $\eta_1 < \eta_2$ | $A_1 = A_2$ | $B_1 > B_2$ | First ink > second ink |
| | 3 | $\eta_1 = \eta_2$ | $A_1 = A_2$ | $B_1 > B_2$ | First ink > second ink |
| | 4 | $\eta_1 < \eta_2$ | $A_1 = A_2$ | $B_1 > B_2$ | First ink > second ink |
| | 5 | $\eta_1 > \eta_2$ | $A_1 = A_2$ | $B_1 > B_2$ | First ink > second ink |
| Reference | 1 | $\eta_1 > \eta_2$ | $A_1 = A_2$ | $B_1 > B_2$ | First ink > second ink |
| Example | 2 | $\eta_1 = \eta_2$ | $A_1 = A_2$ | $B_1 = B_2$ | First ink = second ink |
| | 3 | $\eta_1 = \eta_2$ | $A_1 = A_2$ | $B_1 = B_2$ | First ink = second ink |

| | | Recording head | | | |
|---|---|---|---|---|---|
| | | Flow step (circulation flow) | Flow speed (mm/s) | Scanning type | Scanning speed (inches/sec) |
| Example | 1 | Present | 10.0 | Serial | 40 |
| | 2 | Present | 10.0 | Serial | 40 |
| | 3 | Present | 10.0 | Serial | 40 |
| | 4 | Present | 10.0 | Serial | 40 |
| | 5 | Present | 10.0 | Serial | 40 |
| | 6 | Present | 10.0 | Serial | 40 |
| | 7 | Present | 10.0 | Serial | 40 |
| | 8 | Present | 10.0 | Serial | 40 |
| | 9 | Present | 10.0 | Serial | 40 |
| | 10 | Present | 10.0 | Serial | 40 |

TABLE 2-continued

| | | | | | |
|---|---|---|---|---|---|
| Evaluation conditions and evaluation result | | | | | |
| | 11 | Present | 10.0 | Serial | 40 |
| | 12 | Present | 10.0 | Serial | 40 |
| | 13 | Present | 10.0 | Serial | 40 |
| | 14 | Present | 10.0 | Serial | 40 |
| | 15 | Present | 10.0 | Serial | 40 |
| | 16 | Present | 10.0 | Serial | 40 |
| | 17 | Present | 10.0 | Serial | 40 |
| | 18 | Present | 10.0 | Serial | 40 |
| | 19 | Present | 10.0 | Serial | 40 |
| | 20 | Present | 10.0 | Serial | 40 |
| | 21 | Present | 10.0 | Serial | 40 |
| | 22 | Present | 10.0 | Serial | 40 |
| | 23 | Present | 10.0 | Serial | 40 |
| | 24 | Present | 10.0 | Serial | 70 |
| | 25 | Present | 10.0 | Serial | 72 |
| | 26 | Present | 0.8 | Serial | 40 |
| | 27 | Present | 1.0 | Serial | 40 |
| | 28 | Present | 100.0 | Serial | 40 |
| | 29 | Present | 110.0 | Serial | 40 |
| | 30 | Present | 10.0 | Serial | 40 |
| | 31 | Present | 10.0 | Serial | 40 |
| Comparative | 1 | Present | 10.0 | Serial | 40 |
| Example | 2 | Present | 10.0 | Serial | 40 |
| | 3 | Absent | — | Serial | 40 |
| | 4 | Absent | — | Serial | 40 |
| | 5 | Absent | — | Serial | 40 |
| Reference | 1 | Present | 10.0 | Line | — |
| Example | 2 | Present | 10.0 | Serial | 40 |
| | 3 | Present | 10.0 | Serial | 40 |

| | | Recording head | | Recording | Evaluation result |
|---|---|---|---|---|---|
| | | Distance between ejection orifice arrays (mm) | Warming of ink | medium Heating step | Shift in color tone of secondary color image |
| Example | 1 | 0.7 | Present | Absent | A |
| | 2 | 0.7 | Present | Absent | A |
| | 3 | 0.7 | Present | Absent | A |
| | 4 | 0.7 | Present | Absent | A |
| | 5 | 0.7 | Present | Absent | A |
| | 6 | 0.7 | Present | Absent | A |
| | 7 | 0.7 | Present | Absent | A |
| | 8 | 0.7 | Present | Absent | A |
| | 9 | 0.7 | Present | Absent | A |
| | 10 | 0.7 | Present | Absent | B |
| | 11 | 0.7 | Present | Absent | A |
| | 12 | 0.7 | Present | Absent | A |
| | 13 | 0.7 | Present | Absent | B |
| | 14 | 0.7 | Present | Absent | B |
| | 15 | 0.7 | Present | Absent | A |
| | 16 | 0.7 | Present | Absent | B |
| | 17 | 0.7 | Present | Absent | A |
| | 18 | 0.7 | Present | Absent | B |
| | 19 | 0.7 | Present | Absent | B |
| | 20 | 0.7 | Present | Absent | B |
| | 21 | 0.7 | Present | Absent | B |
| | 22 | 0.7 | Present | Absent | B |
| | 23 | 0.7 | Absent | Absent | B |
| | 24 | 0.7 | Present | Absent | A |
| | 25 | 0.7 | Present | Absent | B |
| | 26 | 0.7 | Present | Absent | B |
| | 27 | 0.7 | Present | Absent | A |
| | 28 | 0.7 | Present | Absent | A |
| | 29 | 0.7 | Present | Absent | B |
| | 30 | 1.8 | Present | Absent | A |
| | 31 | 2.0 | Present | Absent | B |
| Comparative | 1 | 0.7 | Present | Absent | C |
| Example | 2 | 0.7 | Present | Absent | C |
| | 3 | 0.7 | Present | Absent | C |
| | 4 | 0.7 | Present | Absent | C |
| | 5 | 0.7 | Present | Absent | C |
| Reference | 1 | 0.7 | Present | Absent | A |
| Example | 2 | 0.7 | Present | Absent | A |
| | 3 | 0.7 | Present | Absent | A |

Comparative Examples 3 to 5 are each an example in which the image was recorded under such a condition that the flow step, which was separate from the ejection step, of flowing the ink in the first flow path into the second flow path was not performed. In this case, the flow direction of the ink serving as a reference is not present, and hence the "first" and "second" are not defined for the ejection orifice arrays and the inks. However, for convenience, the ejection orifice arrays and the inks were assigned as shown in Table 2. In each of Comparative Examples 3 to 5, the ejection stability was insufficient, and it was required to perform the preliminary ejection operation. Reference Example 1 is an example in which a recording head of a line type corresponding to the width of the recording medium was used as the recording head. In Reference Example 1, an image was recorded without reciprocal movement of the recording head, and hence no change in color tone caused by mixing of the colors occurred. In each of Reference Examples 2 and 3, in which dye inks were used, no shift in color tone of the secondary color image occurred irrespective of the magnitude relationship between the molar fraction $R_1$ of water in the first ink and the molar fraction $R_2$ of water in the second ink.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-096385, filed Jun. 12, 2023, and Japanese Patent Application No. 2024-085388, filed May 27, 2024, which are hereby incorporated by reference herein in their entirety.

What is claimed is:

1. An ink jet recording method comprising recording an image by ejecting an ink from a recording head including: a plurality of ejection orifices each configured to eject the ink; an ejection element configured to generate energy for ejecting the ink; and a first flow path and a second flow path which communicate to each other between each of the plurality of ejection orifices and the ejection element and inside which the ink flows, the ink jet recording method comprising:

an ejection step of ejecting the ink from the plurality of ejection orifices; and a flow step, which is separate from the ejection step, of flowing the ink in the first flow path into the second flow path, wherein the recording head is a recording head of a serial type which includes an ejection element substrate including a plurality of ejection orifice arrays each having the plurality of ejection orifices arranged in a predetermined direction and which is scanned in a direction intersecting with an arrangement direction of the ejection orifice arrays, wherein the first flow path and the second flow path are arranged in parallel to a scanning direction of the recording head and have the same flow direction of the ink, wherein the plurality of ejection orifice arrays includes a first ejection orifice array configured to eject a first ink and a second ejection orifice array configured to eject a second ink, and the first ejection orifice array and the second ejection orifice array are arranged on an upstream side and on a downstream side, respectively, with respect to the flow direction of the ink, wherein the first ink and the second ink are each an aqueous ink comprising a pigment, and wherein a molar fraction $R_1$ of water in the first ink and a molar fraction $R_2$ of water in the second ink satisfy a relationship of $R_1 < R_2$.

2. The ink jet recording method according to claim 1, wherein the molar fraction $R_1$ of water in the first ink and the molar fraction $R_2$ of water in the second ink satisfy a relationship of $0.5 \leq R_2 - R_1 \leq 5.0$.

3. The ink jet recording method according to claim 1, wherein a lightness of the first ink is higher than a lightness of the second ink.

4. The ink jet recording method according to claim 1, wherein a viscosity $\eta_1$ of the first ink and a viscosity $\eta_2$ of the second ink satisfy a relationship of $\eta_1 \geq \eta_2$.

5. The ink jet recording method according to claim 1,
wherein the first ink and the second ink each comprise a water-soluble resin, and
wherein a content $A_1$ (% by mass) of the water-soluble resin in the first ink and a content $A_2$ (% by mass) of the water-soluble resin in the second ink satisfy a relationship of $A_1 \geq A_2$.

6. The ink jet recording method according to claim 1,
wherein the first ink and the second ink each comprise a resin particle, and
wherein a content $B_1$ (% by mass) of the resin particle in the first ink and a content $B_2$ (% by mass) of the resin particle in the second ink satisfy a relationship of $B_1 > B_2$.

7. The ink jet recording method according to claim 1,
wherein the first ink and the second ink each comprise a resin particle and a water-soluble organic solvent, and
wherein a content $C_1$ (% by mass) of the pigment, a content $B_1$ (% by mass) of the resin particle and a content $D_1$ (% by mass) of the water-soluble organic solvent in the first ink and a content $C_2$ (% by mass) of the pigment, a content $B_2$ (% by mass) of the resin particle and a content $D_2$ (% by mass) of the water-soluble organic solvent in the second ink satisfy a relationship represented by the following formula (1)

$$(C_1 + B_1)/D_1 > (C_2 + B_2)/D_2 \tag{1}$$

8. The ink jet recording method according to claim 1, further comprising a step of warming the ink in the recording head.

9. The ink jet recording method according to claim 1, wherein the ink jet recording method is free of a step of heating a recording medium to which the ink has been applied.

10. The ink jet recording method according to claim 1, wherein a flow speed of the ink during the flowing is 1.0 mm/s or more to 100.0 mm/s or less.

11. The ink jet recording method according to claim 1, wherein a moving speed of the recording head during the scanning is 70 inches/sec or less.

12. The ink jet recording method according to claim 1, wherein a distance between the first ejection orifice array and the second ejection orifice array is 1.8 mm or less.

13. An ink jet recording apparatus comprising a recording head including: a plurality of ejection orifices each configured to eject the ink; an ejection element configured to generate energy for ejecting the ink; and a first flow path and a second flow path which communicate to each other between each of the plurality of ejection orifices and the ejection element and inside which the ink flows, the ink jet recording apparatus further comprising a flow unit, which is separate from the ejection element, configured to flow the ink in the first flow path into the second flow path, wherein the recording head is a recording head of a serial type which includes an ejection element substrate including a plurality of ejection orifice arrays each having the plurality of ejection orifices arranged in a predetermined direction and which is scanned in a direction intersecting with an arrangement direction of the ejection orifice arrays, wherein the first flow path and the second flow path are arranged in parallel to a scanning direction of the recording head and have the same flow direction of the ink, wherein the plurality of ejection orifice arrays includes a first ejection orifice array configured to eject a first ink and a second ejection orifice array configured to eject a second ink, and the first ejection orifice array and the second ejection orifice array are arranged on an upstream side and on a downstream side, respectively, with respect to the flow direction of the ink, wherein the first ink and the second ink are each an aqueous ink comprising a pigment, and wherein a molar fraction $R_1$ of water in the first ink and a molar fraction $R_2$ of water in the second ink satisfy a relationship of $R_1 < R_2$.

* * * * *